United States Patent
Park

(10) Patent No.: US 10,945,168 B2
(45) Date of Patent: *Mar. 9, 2021

(54) HANDOVER METHOD

(71) Applicant: ELECTRONICS AND TELECOMMUNICATIONS RESEARCH INSTITUTE, Daejeon (KR)

(72) Inventor: Hyun Seo Park, Daejeon (KR)

(73) Assignee: ELECTRONICS AND TELECOMMUNICATIONS RESEARCH INSTITUTE, Daejeon (KR)

(*) Notice: Subject to any disclaimer, the term of this patent is extended or adjusted under 35 U.S.C. 154(b) by 0 days.

This patent is subject to a terminal disclaimer.

(21) Appl. No.: 16/082,599

(22) PCT Filed: Apr. 19, 2017

(86) PCT No.: PCT/KR2017/004171
§ 371 (c)(1),
(2) Date: Sep. 6, 2018

(87) PCT Pub. No.: WO2017/183897
PCT Pub. Date: Oct. 26, 2017

(65) Prior Publication Data
US 2019/0104452 A1    Apr. 4, 2019

(30) Foreign Application Priority Data

Apr. 20, 2016  (KR) .................. 10-2016-0048415
Apr. 26, 2016  (KR) .................. 10-2016-0050852
(Continued)

(51) Int. Cl.
H04W 36/00  (2009.01)
H04L 1/00   (2006.01)
(Continued)

(52) U.S. Cl.
CPC ........... *H04W 36/0085* (2018.08); *H04L 1/00* (2013.01); *H04L 5/0055* (2013.01);
(Continued)

(58) Field of Classification Search
CPC ........... H04W 36/0085; H04W 36/023; H04W 36/08; H04W 36/18; H04W 36/36;
(Continued)

(56) References Cited

U.S. PATENT DOCUMENTS 7,418,264 B2   8/2008  Kim
7,801,078 B2   9/2010  Kim et al.
(Continued)

FOREIGN PATENT DOCUMENTS

CN   101198155 A   6/2008
CN   101296163 A   10/2008
(Continued)

OTHER PUBLICATIONS

3GPP TSG-RAN WG2 Meeting #91bis, "Handover Latency Improvements", R2-154810 (Year: 2015).*
(Continued)

Primary Examiner — Yemane Mesfin
Assistant Examiner — Intekhaab A Siddiquee
(74) Attorney, Agent, or Firm — LRK Patent Law Firm

(57) ABSTRACT

A UE receives a handover command from a source eNB, and transmits a handover indication message to the source eNB while maintaining a connection to the source eNB. After transmitting the handover indication message, the UE disconnects the connection to the source eNB. Further, the UE accesses to a target eNB. A handover command includes information indicating timing advance if a handover without a random access procedure is configured.

22 Claims, 27 Drawing Sheets

(30) Foreign Application Priority Data

| | | |
|---|---|---|
| May 23, 2016 | (KR) | 10-2016-0062853 |
| Aug. 5, 2016 | (KR) | 10-2016-0100057 |
| Sep. 9, 2016 | (KR) | 10-2016-0116367 |
| Sep. 30, 2016 | (KR) | 10-2016-0126982 |
| Oct. 20, 2016 | (KR) | 10-2016-0136715 |
| Apr. 18, 2017 | (KR) | 10-2017-0050028 |
| Apr. 18, 2017 | (KR) | 10-2017-0050029 |
| Apr. 18, 2017 | (KR) | 10-2017-0050030 |
| Apr. 18, 2017 | (KR) | 10-2017-0050031 |

(51) Int. Cl.

| | |
|---|---|
| *H04W 36/02* | (2009.01) |
| *H04W 36/38* | (2009.01) |
| *H04W 36/08* | (2009.01) |
| *H04W 36/18* | (2009.01) |
| *H04W 76/27* | (2018.01) |
| *H04W 56/00* | (2009.01) |
| *H04L 5/00* | (2006.01) |
| *H04W 40/36* | (2009.01) |
| *H04W 36/36* | (2009.01) |
| *H04L 1/18* | (2006.01) |
| *H04W 80/08* | (2009.01) |

(52) U.S. Cl.
CPC ... *H04W 36/00837* (2018.08); *H04W 36/023* (2013.01); *H04W 36/08* (2013.01); *H04W 36/18* (2013.01); *H04W 36/36* (2013.01); *H04W 36/38* (2013.01); *H04W 40/36* (2013.01); *H04W 56/001* (2013.01); *H04W 56/004* (2013.01); *H04W 76/27* (2018.02); *H04L 1/1867* (2013.01); *H04L 2001/0097* (2013.01); *H04W 80/08* (2013.01)

(58) Field of Classification Search
CPC ........... H04W 36/38; H04W 36/00837; H04W 56/001; H04W 56/004; H04W 76/27; H04W 80/08; H04L 1/00; H04L 1/1867; H04L 5/0055; H04L 2001/0097
USPC ........................................................ 370/331
See application file for complete search history.

(56) References Cited

U.S. PATENT DOCUMENTS

| | | | |
|---|---|---|---|
| 7,920,510 | B2 | 4/2011 | Kim et al. |
| 7,986,949 | B2 | 7/2011 | Ryu et al. |
| 8,054,836 | B2 | 11/2011 | Fischer |
| 8,060,093 | B2 | 11/2011 | Jang et al. |
| 8,116,279 | B2 | 2/2012 | Kim et al. |
| 8,131,295 | B2 | 3/2012 | Wang et al. |
| 8,509,791 | B2 | 8/2013 | Damnjanovic |
| 8,547,936 | B2 | 10/2013 | Kim et al. |
| 8,554,238 | B2 | 10/2013 | Hwang et al. |
| 8,699,459 | B2 | 4/2014 | Jung et al. |
| 8,774,807 | B2 | 7/2014 | Jung et al. |
| 8,886,191 | B2 | 11/2014 | Wang et al. |
| 9,008,040 | B2 | 4/2015 | Song et al. |
| 9,113,374 | B2 | 8/2015 | Wang et al. |
| 9,119,126 | B2 | 8/2015 | Gil et al. |
| 9,125,127 | B2 | 9/2015 | Wei |
| 9,264,956 | B2 | 2/2016 | Kim et al. |
| 9,307,464 | B2 | 4/2016 | Worrall |
| 9,497,683 | B2 | 11/2016 | Park et al. |
| 9,992,812 | B2 | 6/2018 | Watanabe et al. |
| 10,512,009 | B2 | 12/2019 | Wang et al. |
| 2007/0213056 | A1 | 9/2007 | Im et al. |
| 2011/0064053 | A1 | 3/2011 | Cha et al. |
| 2012/0021747 | A1 | 1/2012 | Brandt |
| 2012/0195287 | A1 | 8/2012 | Jung et al. |
| 2014/0023043 | A1 | 1/2014 | Yang et al. |
| 2015/0038148 | A1* | 2/2015 | Park ................ H04W 36/0055 455/437 |
| 2015/0181493 | A1 | 6/2015 | Park et al. |
| 2015/0319653 | A1 | 11/2015 | Wang et al. |
| 2015/0358864 | A1 | 12/2015 | Park et al. |
| 2016/0007261 | A1 | 1/2016 | Oh et al. |
| 2016/0135103 | A1* | 5/2016 | Lee ....................... H04W 28/08 455/444 |

FOREIGN PATENT DOCUMENTS

| | | | |
|---|---|---|---|
| CN | 102144417 A | | 8/2011 |
| CN | 102348226 A | | 2/2012 |
| CN | 104301955 A | | 1/2015 |
| JP | 2014-513465 A | | 5/2014 |
| KR | 10-2006-0012099 A | | 2/2006 |
| KR | 10-2009-0019920 A | | 2/2009 |
| KR | 10-1104517 B1 | | 1/2012 |
| KR | 10-2012-0032296 A | | 4/2012 |
| KR | 10-1145849 B1 | | 5/2012 |
| KR | 10-2012-0087649 A | | 8/2012 |
| KR | 10-1191491 B1 | | 10/2012 |
| KR | 10-1265624 B1 | | 5/2013 |
| KR | 10-2014-0049455 A | | 4/2014 |
| KR | 10-2014-0051839 A | | 5/2014 |
| KR | 10-1462682 B1 | | 11/2014 |
| KR | 10-2015-0106422 A | | 9/2015 |
| KR | 10-1600853 B1 | | 3/2016 |
| WO | 2015/127987 A1 | | 9/2015 |
| WO | WO-2015127987 A1 * | | 9/2015 ............ H40W 36/08 |

OTHER PUBLICATIONS

Search Report, dated Jul. 26, 2017, for International Application No. PCT/KR2017/004171.
Written Opinion, dated Jul. 26, 2017, for International Application No. PCT/KR2017/004171.
"Further Discussion on Reliability Issue of UE Indication", 3GPP TSG-RAN WG2 Meeting #96, R2-167912, Reno, USA, Nov. 14-18, 2016 (Resubmission of R2-166580).
"Inaccurate eNB Estimation vs. Accurate UE Indication", 3GPP TSG-RAN WG2 Meeting #96, R2-167910, Reno, USA, Nov. 14-18, 2016.
"Handover Procedure in NR", 3GPP TSG-RAN WG2 Meeting #96, R2-167909, Reno, USA, Nov. 14-18, 2016.
"Remaining Issues on Running Stage 3 CR", 3GPP TSG-RAN WG2 Meeting #95bis, R2-166696, Kaohsiung, Taiwan, Oct. 10-14, 2016.
"Hybrid controlled Mobility for NR", 3GPP TSG-RAN WG2 Meeting #95bis, R2-166584, Kaohsiung, Taiwan, Oct. 10-14, 2016.
"Remaining Issues on Running Stage 2 CR", 3GPP TSG-RAN WG2 Meeting #95bis, R2-166577, Kaohsiung, Taiwan, Oct. 10-14, 2016.
"Further Details of Option 6 for Solution 2", 3GPP TSG-RAN WG2 Meeting #94, R2-164329, Nanjing, China, May 23-27, 2016.
"Further Details of Option 6 for Solution 2", 3GPP TSG-RAN WG2 Meeting #94, R2-163866, Nanjing, China, May 23-27, 2016.
"Considerations on Solution 1 and 2 for Mobility Enhancements", 3GPP TSG-RAN WG2 Meeting #93bis, R2-162899, Dubrovnik, Croatia, Apr. 11-15, 2016.
"Synchronized Handover for Latency Reduction", 3GPP TSG-RAN WG2 #92, R2-156412, Anaheim, USA, Nov. 16-20, 2015.
"Text Proposal to TR 38.804 capturing the latest agreements up to RAN2 #96", 3GPP TSG-RAN WG2 NR Ad Hoc, Draft R2-1700053, Jan. 17-19, 2017 Spokane, USA.
"Discussion on Handover Procedure Optimization", 3GPP TSG-RAN2 NR Ad Hoc, R2-1700047, Spokane, USA, Jan. 17-19, 2017.
"Introduction of RACH-less and make before break", 3GPP TSG RAN WG2 Meeting #96, R2-169132, Reno, Nevada, Nov. 14-18, 2016.
"Introduction of mobility enhancement solutions in RRC", 3GPP TSG-RAN2 Meeting #96, R2-168954, Reno, Nevada, USA, Nov. 14-18, 2016.

(56) References Cited

OTHER PUBLICATIONS

Intel Corporation, "Discussion of solution 2: Maintaining source eNB connection during handover", 3GPP TSG RAN WG2 Meeting #93bis, R2-162719, Dubrovnik, Croatia, Apr. 11-15, 2016.

Huawei, "Maintaining Source eNB Connection during Handover", 3GPP TSG-RAN3 Meeting #91-bis, R3-160636, Bangalore, India, Apr. 11-15, 2016.

ZTE Corporation, " Analysis on solutions for service interruption reduction in mobility events", 3GPP TSG-RAN3 Meeting #91-bis, R3-160621, Bangalore, India, Apr. 11-15, 2016.

SIPO Office Action, dated Dec. 30, 2020, for Chinese Patent Application No. 201780024631.9 which corresponds to the above-identified U.S. application.

* cited by examiner

HANDOVER METHOD

CROSS-REFERENCE TO RELATED APPLICATIONS

The present application is a U.S. National Phase entry from International Application No. PCT/KR2017/004171, filed Apr. 19, 2017, which claims priority to Korean Patent Application Nos. 10-2016-0048415, filed Apr. 20, 2016, 10-2016-0050852, filed Apr. 26, 2016, 10-2016-0062853, filed May 23, 2016, 10-2016-0100057, filed Aug. 5, 2016, 10-2016-0116367, filed Sep. 9, 2016, 10-2016-0126982, filed Sep. 30, 2016, 10-2016-0136715, filed Oct. 20, 2016, 10-2017-0050028, filed Apr. 18, 2017, 10-2017-0050029, filed Apr. 18, 2017, 10-2017-0050030, filed Apr. 18, 2017, and 10-2017-0050031, filed Apr. 18, 2017, the disclosures of which are incorporated by reference herein in their entirety.

BACKGROUND OF THE INVENTION

1. Technical Field

The present invention relates to a handover method.

2. Description of Related Art

In a wireless communication system, when a handover occurs by movement of a terminal, a data interruption time, in which the terminal does not receive data while disconnecting from a source base station and connecting to a target base station, occurs. If a handover failure or a radio link failure occurs during the handover, the data interruption time becomes larger.

SUMMARY OF THE INVENTION

The present invention is to provide a handover method and apparatus for reducing a data interruption time.

According to an embodiment of the present invention, a handover method of a UE is provided. The handover includes receiving a handover command from a source eNB, deciding a time point of a handover execution while maintaining a connection to the source eNB, and executing a handover based on the time point of the handover execution.

Executing the handover may include disconnecting the connection to the source eNB based on the time point of the handover execution, and accessing a target eNB.

Executing the handover may further include transmitting a handover indication message to the source eNB at the time point of the handover execution. In this case, the UE may disconnect the connection to the source eNB after receiving an acknowledgement (ACK) on the handover indication message from the source eNB.

Executing the handover may further include transmitting a handover indication message to the source eNB at the time point of the handover execution. In this case, the UE may disconnect the connection to the source eNB regardless of a response to the handover indication message from the source eNB.

The UE may disconnect the connection to the source eNB at the time point of the handover execution immediately.

Executing the handover may include accessing a target eNB at the time point of the handover execution, and disconnecting a connection to the source eNB.

The handover method may further include transmitting to the source eNB a data forwarding request message for requesting data forwarding to the target eNB.

According to another embodiment of the present invention, a handover method of an eNB is provided. The handover method includes transmitting a handover command to a UE, deciding a time point of a handover by the UE, disconnecting a connection to the UE at the time point of the handover, and forwarding data to a target eNB.

Deciding the time point of the handover may include receiving a handover indication message from the UE, and determining that a time point at which an ACK on the handover indication message is transmitted is the time point of the handover.

Deciding the time point of the handover may include estimating the time point of the handover by the UE based on the handover command transmitted to the UE.

The eNB may transmit data to the UE while forwarding the same data to the target eNB.

The handover method may further include transmitting a downlink sequence number status transfer message and an uplink sequence number status transfer message to the target eNB.

According to yet another embodiment of the present invention, a handover method of a UE is provided. The handover method includes receiving a SeNB change command from a master eNB, deciding a time point of a SeNB change execution while maintaining a connection to a source SeNB, and executing the SeNB change based on the time point of the SeNB change execution.

Executing the SeNB change includes disconnecting a connection to the source SeNB based on the time point of the SeNB change execution, and accessing a target SeNB.

Executing the SeNB change may further include transmitting a SeNB change indication message to the source SeNB at the time point of the SeNB change execution. In this case, the UE may disconnect the connection to the source SeNB after receiving an ACK on the SeNB change indication message from the source SeNB.

Executing the SeNB change may further include transmitting a SeNB change indication message to the source SeNB at the time point of the SeNB change execution. In this case, the UE may disconnect the connection to the source SeNB regardless of a response to the SeNB change indication message from the source SeNB.

The UE may disconnect the connection to the source SeNB at the time point of the SeNB change immediately.

Executing the SeNB change may include accessing a target SeNB at the time point of the SeNB change execution, and disconnecting a connection to the source SeNB.

The handover method may further include transmitting to the source SeNB a data forwarding request message for requesting data forwarding to the target SeNB.

According to still another embodiment of the present invention, a handover method of a SeNB is provided. The handover method includes deciding a time point of a SeNB change by a UE, disconnecting a connection to the UE at the time point of the SeNB change, and forwarding data to a target SeNB.

Deciding the time point of the SeNB change may include receiving a SeNB change indication message from the UE, and determining that a time point at which an ACK on the SeNB change indication message is transmitted is the time point of the SeNB change.

Deciding the time point of the SeNB change may include estimating the time point of the SeNB change by the UE.

The SeNB may transmit data to the UE while forwarding the same data to the target SeNB.

The handover method may further include transmitting a downlink sequence number status transfer message and an uplink sequence number status transfer message to the target SeNB.

According to still another embodiment of the present invention, a handover apparatus of a UE is provided. The handover apparatus includes a processor and a transceiver. The transceiver receives a handover command from a source eNB. The processor decides a time point of a handover execution while maintaining a connection to the source eNB, and executes a handover based on the time point of the handover execution.

According to still another embodiment of the present invention, a handover apparatus of an eNB is provided. The handover apparatus includes a processor and a transceiver. The transceiver transmits a handover command to a UE. The processor decides a time point of a handover by the UE, and disconnects a connection to the UE at the time point of the handover. Further, the transceiver forwards data to a target eNB.

According to still another embodiment of the present invention, a handover apparatus of a UE is provided. The handover apparatus includes a processor and a transceiver. The transceiver receives a SeNB change command from a master eNB. The processor decides a time point of a SeNB change execution while maintaining a connection to a source SeNB, and executes the SeNB change based on the time point of the SeNB change execution.

According to still another embodiment of the present invention, a handover apparatus of a SeNB is provided. The handover apparatus includes a processor and a transceiver. The processor decides a time point of a SeNB change by a UE, disconnects a connection to the UE at the time point of the SeNB change. The transceiver forwards data to a target SeNB.

Advantageous Effects

According to an embodiment of the present invention, a data interruption time can be reduced or removed when a UE performs a handover from a source eNB to a target eNB. In dual connectivity configuration, a data interruption time can be reduced or removed when a UE performs a handover from a source SeNB to a target SeNB.

DETAILED DESCRIPTION OF THE INVENTION

Figure 1:
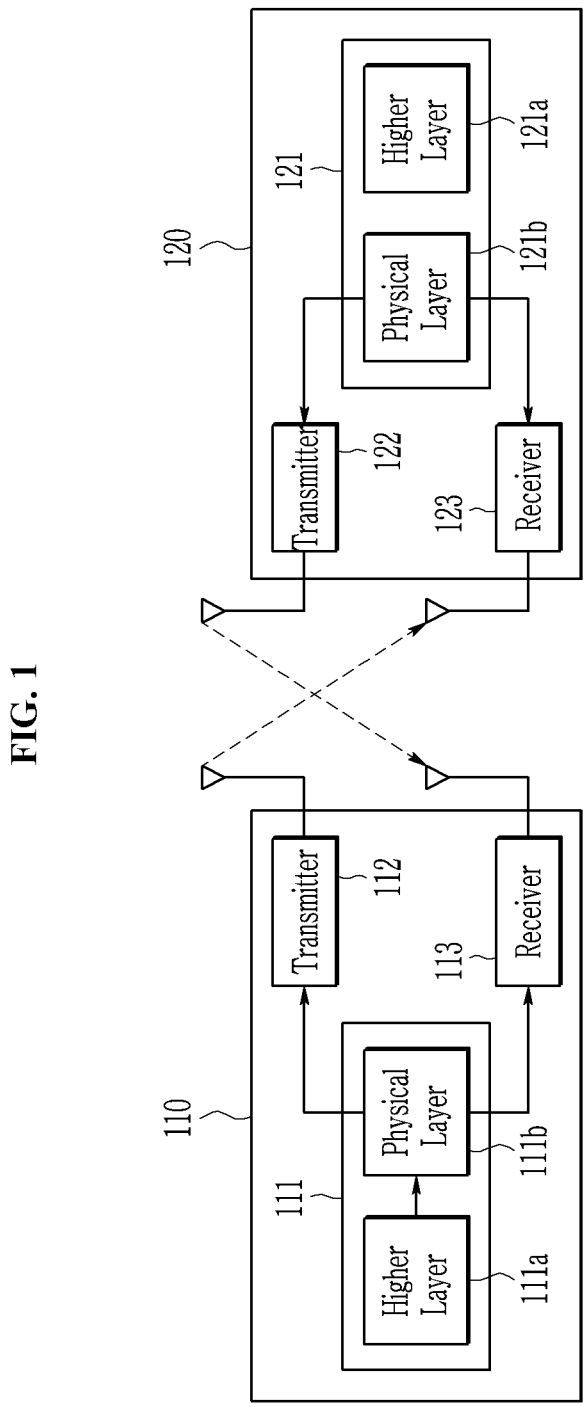
FIG. 1 is a schematic diagram of a wireless communication system according to an embodiment of the present invention.

In the following detailed description, only certain embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In the specification, a term "user equipment (UE)" may designate a terminal, a mobile station (MS), a mobile terminal (MT), an advanced mobile station (AMS), a high reliability mobile station (HR-MS), a subscriber station (SS), a portable subscriber station (PSS), an access terminal (AT), a machine type communication device (MTC device), and so on, or may include all or some functions thereof.

Further, a term "an evolved node B (eNB)" may designate a base station (BS), a node B, an evolved node B (eNB), a gNB, an advanced base station (ABS), a high reliability base station (HR-BS), an access point (AP), a radio access station (RAS), a base transceiver station (BTS), an mobile multihop relay (MMR) BS, a relay station (RS) functioning as the BS, a relay node (RN) functioning as the BS, an advance relay station (ARS) functioning as the BS a high reliability relay station (HR-RS) functioning as the BS, a small BS [e.g., a femto BS, a home node B (HNB), a home eNB (HeNB), a pico BS, a macro BS, a micro BS], and so on, or may include all or some functions thereof.

A term described in the singular may be interpreted as singular or plural unless an explicit term such as "one" or "single" is used.

A wireless communication system according to an embodiment of the present invention is applicable to various wireless communication networks. For example, the wireless communication system may be applied to a wireless communication network based on a current radio access technology (RAT) or 5G or next generation wireless communication network. The 3GPP is developing a new RAT-based 5G standard satisfying IMT-2020 requirements, and such a new RAT is called NR (New Radio). For convenience, the NR-based wireless communication system is exemplified in an embodiment of the present invention. However, an embodiment of the present invention is not limited thereto and may be applied to various wireless communication systems.

FIG. 1 is a schematic diagram of a wireless communication system according to an embodiment of the present invention.

Referring to FIG. 1, a wireless communication system includes a plurality of base stations 110 and a plurality of terminals 120.

The base station 110 transmits a downlink data channel and a control channel indicating a resource region through which the corresponding downlink data channel is transmitted. The terminal 120 receives the control channel to identify the resource region, receives the downlink data channel on the corresponding resource region, and decodes data transmitted by the base station 110. The terminal 120 transmits an uplink data channel, and the base station 110 receives the uplink data channel and decodes data transmitted by the terminal 120. In this case, the terminal can identify a resource region through which the uplink data channel is transmitted based on the control channel received from the base station 110.

The base station 110 includes a processor 111 and a transceiver, and the transceiver includes a transmitter 112 and a receiver 113. Each of the processor 111, the transmitter 112, and the receiver 113 may be formed of physical hardware. The transmitter 112 and the receiver 113 may be formed of one piece of hardware (e.g., a chip). All of the processor 111, transmitter 112, and receiver 113 may be formed of one piece of hardware (e.g., a chip).

The processor 111 implements a higher layer 111a and a physical layer 111b, and may execute commands necessary for operations of the base station 110 and control operations of the transmitter 112 and the receiver 113. The transmitter 112 transmits a signal transferred from the physical layer 111b to the terminal 120 through an antenna, and the receiver 113 receives a signal from the terminal 120 through the antenna and transfers the signal to the physical layer 111b.

Similarly, the terminal 120 includes a processor 121 and a transceiver, and the transceiver includes a transmitter 122 and a receiver 123. Each of the processor 121, the transmitter 122, or the receiver 123 may each be formed of physical hardware. The transmitter 122 and the receiver 123 may be formed of one piece of hardware (e.g., a chip). All of the processor 121, the transmitter 122, and the receiver 123 may be formed of one piece of hardware (e.g., a chip).

The processor 121 implements the higher layer 121a and the physical layer 121b, and may execute commands necessary for operations of the terminal 120 and control operations of the transmitter 122 and the receiver 123. The transmitter 122 transmits a signal transferred from the physical layer 121b to the base station 110 through an antenna, and the receiver 123 receives a signal from the base station 110 through the antenna and transfers the signal to the physical layer 121b. The transmitter 1220 and the receiver 1230 may exchange signals with other terminals 120.

Figure 2A:
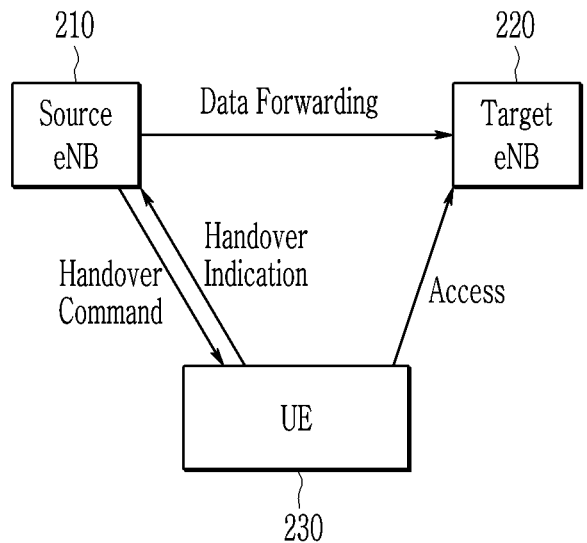
FIG. 2A and FIG. 2B are drawings showing a handover in a wireless communication system according to an embodiment of the present invention.
Figure 2B:
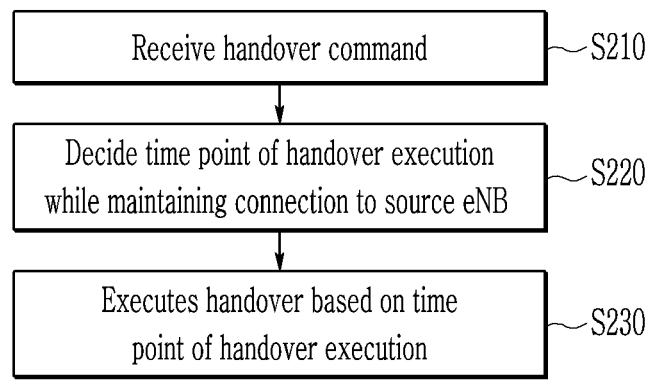

FIG. 2A and FIG. 2B are drawings showing a handover in a wireless communication system according to an embodiment of the present invention.

Referring to FIG. 2A and FIG. 2B, upon deciding a handover, a source eNB 210 transmits a handover command to a UE 230 (S210). For the handover, the UE 230 decides a time point of a handover execution while maintaining a connection to the source eNB 210 (S220), and executes the handover based on the time point of the handover execution (S230). In one embodiment, the UE 230 may disconnect the connection to the source eNB 210 based on the time point of the handover execution, and may access a target eNB 220 (S230). For example, the UE 230 may transmit a handover indication message to the source eNB 210 at the time point of the handover execution, and may disconnect the connection to the source eNB 210 after transmitting the handover indication message. In another embodiment, the UE 230 may access the target eNB 220 at the time point of the handover execution, and may disconnect the connection to the source eNB 210 (S230). Further, the source eNB 210 may forward data to the target eNB 220.

Figure 3A:
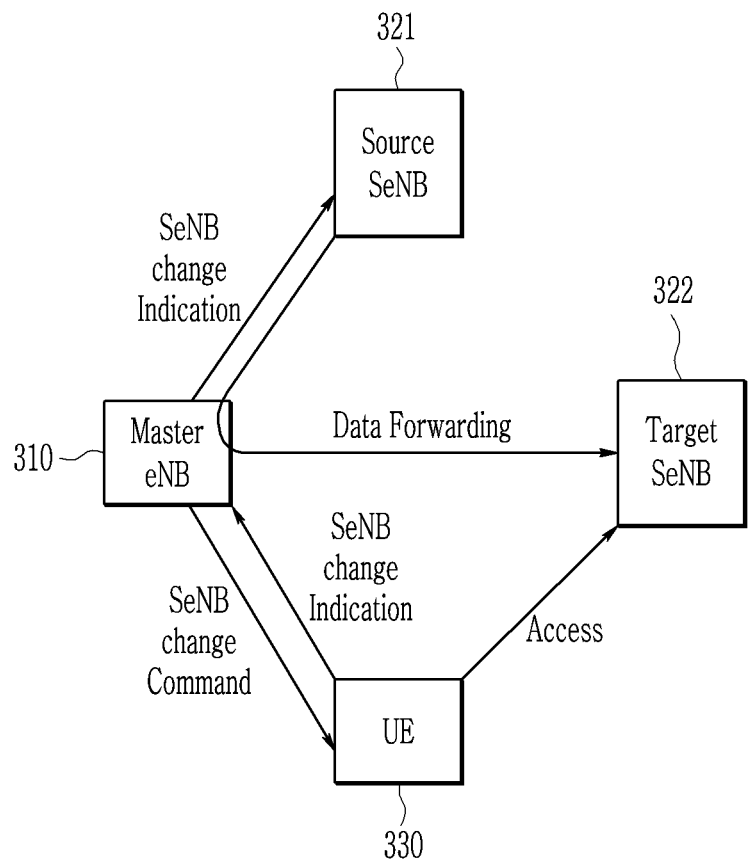
FIG. 3A and FIG. 3B are drawings showing a handover in a wireless communication system according to another embodiment of the present invention.
Figure 3B:
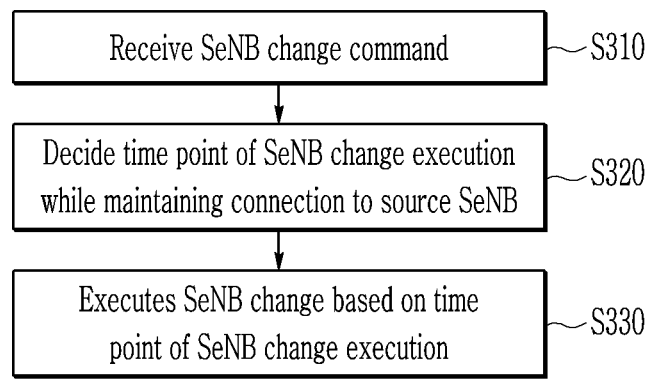

FIG. 3A and FIG. 3B are drawings showing a handover in a wireless communication system according to another embodiment of the present invention.

Referring to FIG. 3A and FIG. 3B, in dual connectivity configuration, upon deciding a SeNB change, a master eNB 310 transmits a SeNB change command to a UE 330 (S310). For the SeNB change, the UE 330 decides a time point of a SeNB change execution while maintaining a connection to a source SeNB 321 (S320), and executes the SeNB change (i.e., handover) based on the time point of the SeNB change execution (S330). In one embodiment, the UE 330 may disconnect the connection to the source SeNB 321 based on the time point of the SeNB change execution, and may access a target SeNB 322 (S330). For example, the UE 330 may transmit a SeNB change indication message to the source SeNB 321 directly or to the source SeNB 321 via the master eNB 310, and may disconnect the connection to the source SeNB 321 after transmitting the SeNB change indication message. In another embodiment, the UE 330 may access the target SeNB 322 at the time point of the SeNB change execution, and may disconnect the connection to the source SeNB 321. Further, the source SeNB 321 may forward data to the target SeNB 322 via the master eNB 310.

Figure 4:
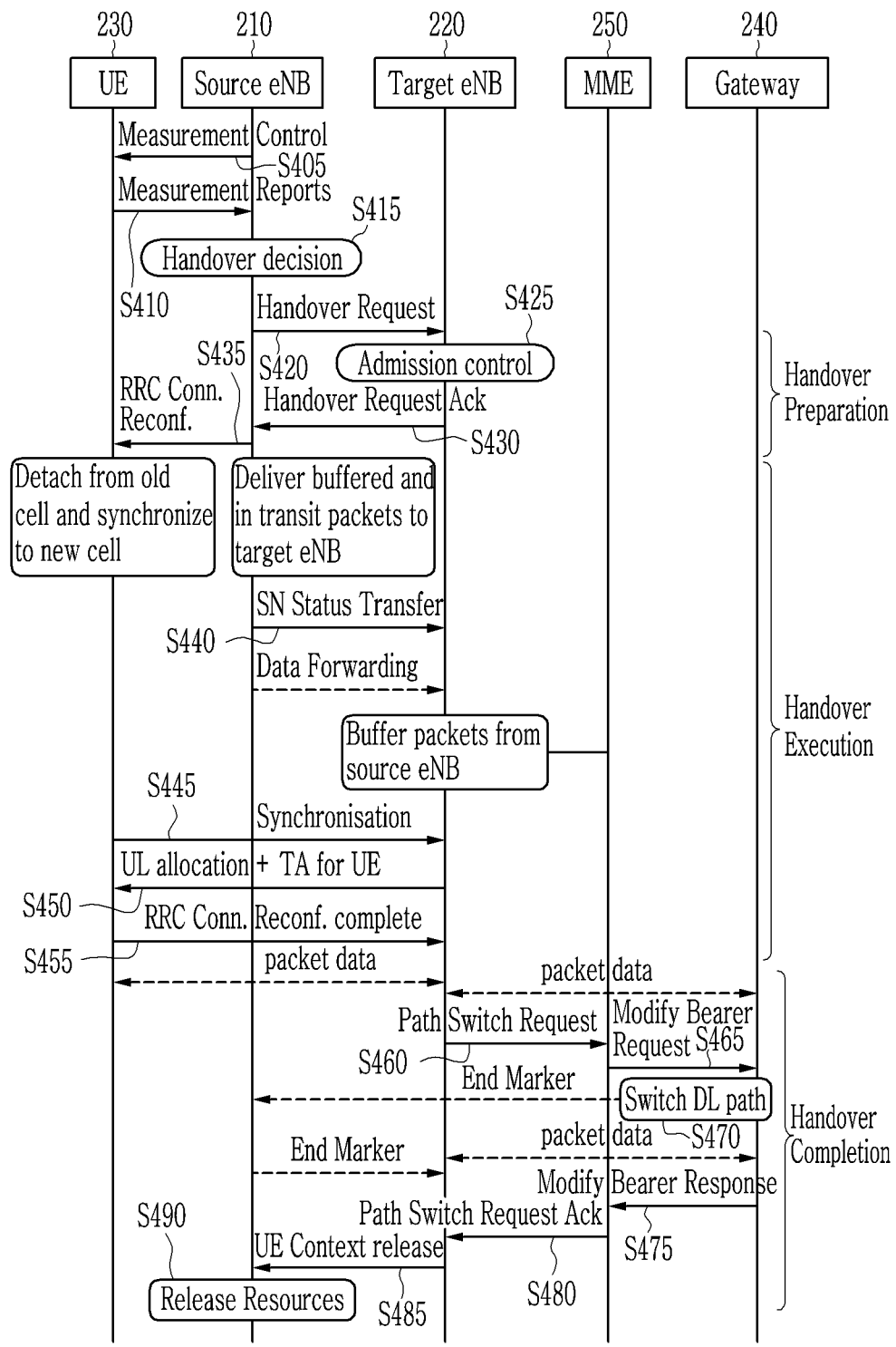
FIG. 4 and FIG. 5 are drawings explaining a handover procedure in a conventional wireless communication system.
Figure 5:
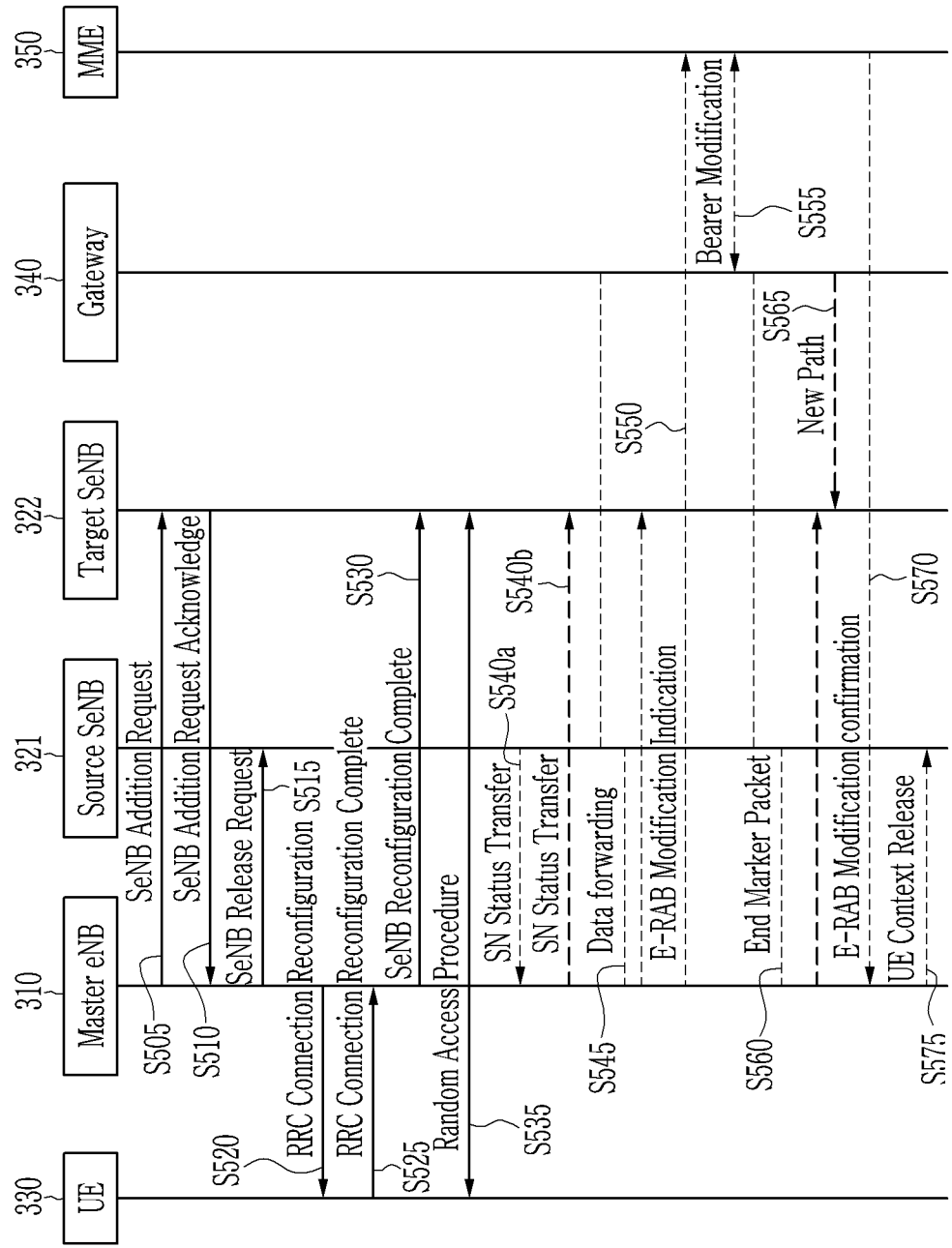

FIG. 4 and FIG. 5 are drawings explaining a handover procedure in a conventional wireless communication system. A handover procedure in the LTE system among the conventional wireless communication systems is shown in FIG. 4 and FIG. 5 as an example. FIG. 5 shows the handover (i.e., SeNB change) procedure from a source SeNB to a target SeNB in the dual connectivity configuration.

Referring to FIG. 4, a source eNB 210 configures a UE measurement procedure (S405). In other words, the source eNB 210 transmits a measurement control message to UE 230 (S405). Accordingly, the UE 230 measures signal strengths of neighboring eNBs, and reports a measurement result to the source eNB 210 through a measurement report message (S410). The source eNB 210 decides a handover based on the measurement report and radio resource management (RRM) information managed by the source eNB 210 (S415).

Upon deciding the handover, the source eNB 210 executes a handover preparation procedure (S420, S425, and S430).

In detail, the source eNB 210 transmits a handover request to a target eNB 220, thereby passing necessary information to prepare the handover at the target eNB 220 (S420). The target eNB 220 performs admission control to reserve resources (S425), and transfers necessary information to prepare the handover to the source eNB 210 through a handover request acknowledge (handover request ACK) message (S430).

Next, a handover execution procedure is performed (S435, S440, S445, and S450).

The source eNB 210 after the handover preparation with the target eNB 220 sends a handover command to the UE 230, thereby commanding the UE to perform the handover (S435). The handover command is delivered through an RRC connection reconfiguration message. The UE 230 receiving the RRC connection reconfiguration message detaches from an old cell, i.e., the source eNB 210, and starts synchronization to connect to a new cell, i.e., the target eNB 220. In this case, a handover interruption time begins since packet transmission and reception between the UE 230 and the source eNB 210 are stopped.

After transmitting the RRC connection reconfiguration message, the source eNB 210 buffers packets received from a gateway and forwards them to the target eNB 220. Further, the source eNB 210 sends a sequence number (SN) status transfer message to the target eNB 220 (S440). The SN status transfer message may include SN values of a packet to be transmitted to the UE 230 and a packet to be received from the UE. For example, the SN status transfer message may an uplink PDCP (packet data convergence protocol) SN receiver status and a downlink PDCP SN transmitter status. The target eNB 220 buffers packets received from the source eNB 210.

After receiving the RRC connection reconfiguration message, the UE 230 synchronizes to the target eNB 220, and accesses the target eNB 220 via a random access channel (RACH) (S445). The target eNB 220 transmits uplink allocation and timing advance in an RACH response (RAR) (S450). When the UE 230 has successfully accessed the target eNB 220, the UE 230 transmits a handover complete message to the target eNB 220 (S455). The handover complete message is transmitted through an RRC connection reconfiguration complete message. Accordingly, the target eNB 220 transmits the buffered downlink packets to the UE 230. When the UE 230 transmits uplink packets, the target eNB 220 receives the uplink packets and transfers the uplink packets to the gateway.

Next, a handover complete procedure is performed (S460, S465, S470, S475, S480, S485, S490, and S495).

The target eNB 220 transmits a path switch request message to a mobility management entity (MME), thereby notifying that the UE has changed the cell (S460). The MME transmits a modify bearer request message to the gateway (S465). The gateway switches a downlink data path to the target eNB 220, and transmits an end marker on an old path to the source eNB 210 (S470). Accordingly, data are exchanged through a path between the gateway and the target eNB, which is newly configured by the switch procedure. Further, the source eNB 210 transfers the end marker to the target eNB 220.

The gateway transmits a modify bearer response message to the MME in response to the modify bearer request message (S475). The MME transmits a path switch request ACK message to the target eNB 220 in response to the path switch request message (S480). After receiving the path switch request ACK message, the target eNB 220, informs success of the handover to the source eNB 210 and triggers release of resources by the source eNB 210, by transmitting a UE context release message (S485). Upon the UE context release message, the source eNB 210 releases resources associated with the UE context (S490).

In FIG. 4, the messages shown in steps S405, S410, S420, S430, S435, S440, S455, S460, S465, S475, S480, and S485 may be transmitted through L3 (layer 3) signaling, and the messages shown in steps S445 and S450 may be transmitted through L1/L2 (layer 1/2) signaling.

In the conventional handover procedure, the source eNB 210 stops data transmission to the UE while transmitting the handover command to the UE 230, and forwards data to the target eNB 220. After receiving the handover complete from the UE 230, the target eNB 220 starts the data transmission to the UE. Accordingly, a time from a time point at which the source eNB 210 stops the data transmission to the UE 230 while transmitting the handover command to a time point at which the target eNB 220 starts the data transmission to the UE 230 after receiving the handover complete may be a data interruption time.

Referring to FIG. 5, in the dual connectivity configuration, a master eNB 310 initiates a change of a SeNB by requesting a target SeNB 322 to allocate resources for a UE 330, by transmitting a SeNB addition request message to the target SeNB 322 (S505). The target SeNB 322 transmits a SeNB addition request ACK message to the master eNB 310 in response to the SeNB addition request (S510).

If the resource allocation of the target SeNB 322 is successful, the master eNB 310 initiates a release of resource of the source SeNB 321 by transmitting a SeNB release request message to the source SeNB 321 (S515). If data forwarding is needed, the master eNB 310 provides data forwarding address to the source SeNB 321. The master eNB 310 indicates a new configuration (i.e., a SeNB change) by an RRC connection reconfiguration message (i.e., a SeNB change command) to the UE 330, to allow the UE 330 apply the new SeNB configuration (S520). In response to the RRC connection reconfiguration message, the UE 330 transmits an RRC connection reconfiguration complete message to the master eNB 310 (S525).

If RRC connection reconfiguration procedure is successful, the master eNB 310 informs the target SeNB 322 by transmitting a SeNB reconfiguration complete message to the target SeNB 322 (S530). The UE 330 synchronizes to the target SeNB 322 and performs a random access procedure (S535).

The source SeNB 321 receiving the SeNB release request message stops data transmission to the UE 330, and transmits an SN status transfer message to the target SeNB 322 via the master eNB 310 (S540a, S540b). Further, the source SeNB 321 buffers packets transferred from a gateway 340, and forwards them to the target SeNB 322 via the master eNB 310 (S545). The data forwarding may be initiated after the source SeNB 321 receives the SeNB release request message.

Next, the master eNB 310 triggers path update to complete the handover, i.e., the secondary cell change. For this, the master eNB 310 transmits a radio bearer access (E-RAB) modification indication message to the MME 350 (S550), and the MME 350 transmits a bearer modification message to the gateway 340 (S555). The radio access bearer (RAB) is exemplified as E-RAB [EUTRAN (evolved UMTS (universal mobile telecommunications system) terrestrial radio access network) RAB]. The gateway 340 receiving the bearer modification message transmits an end marker packet on an old path to the source SeNB 321, and the end marker packet is transferred to the target SeNB 322 via the master eNB 310 (S560). Further, the gateway 340 switches a path into the target SeNB 322 (S565). Data can be exchanged through a path between the gateway 340 and the target SeNB 322, which is newly configured by the switch procedure.

The MME 350 transmits an E-RAB modification confirmation message to the master eNB 310 in response to the E-RAB modification indication message (S570), and the master eNB 310 informs success of the handover by transmitting a UE context release message to the source SeNB 321 (S575).

In the conventional handover procedure, the source SeNB 321 stops the data transmission to the UE while receiving the SeNB release request message, and forwards data to the target SeNB 322 via the master eNB 310. The UE 330 completes the handover, i.e., the secondary cell change by performing the random access procedure to the target SeNB 322. Accordingly, a time from a time point at which the source SeNB 321 stops the data transmission to the UE while receiving the SeNB release request message to a time point at which the UE 330 completes the random access procedure to the target SeNB 322 may be a data interruption time.

Hereinafter, a handover method for reducing the data interruption time are described with reference to FIG. 6A to FIG. 15.

Figure 6A:
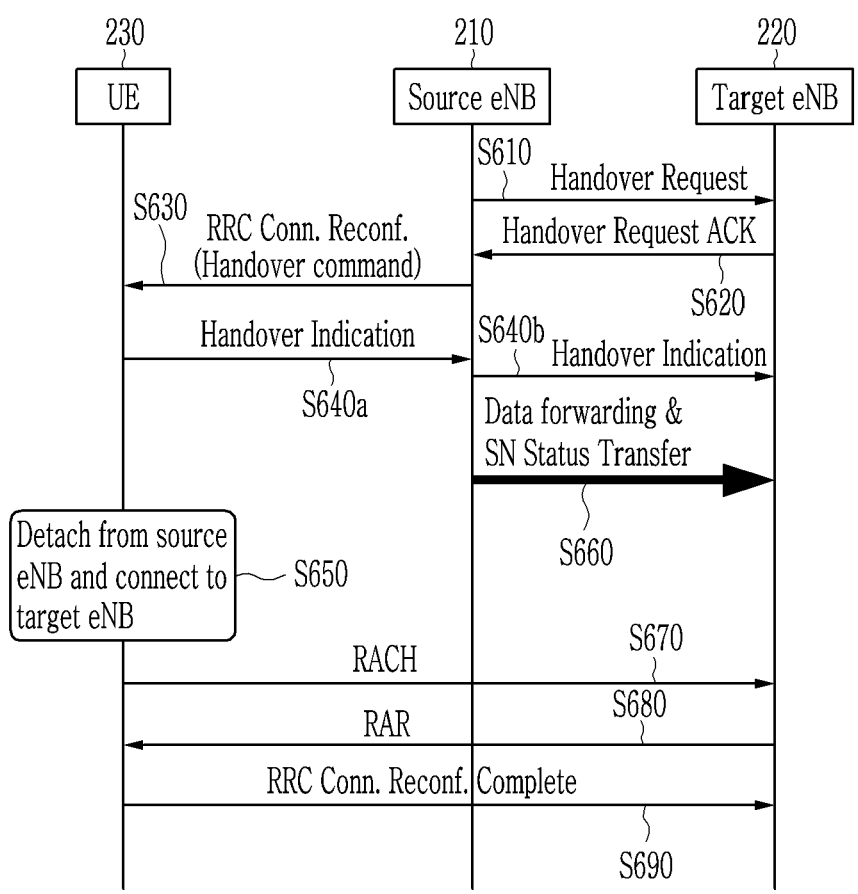
FIG. 6A, FIG. 6B, FIG. 6C, FIG. 6D, FIG. 6E, FIG. 7, and FIG. 8 each show a handover method according to an embodiment of the present invention.
Figure 7:
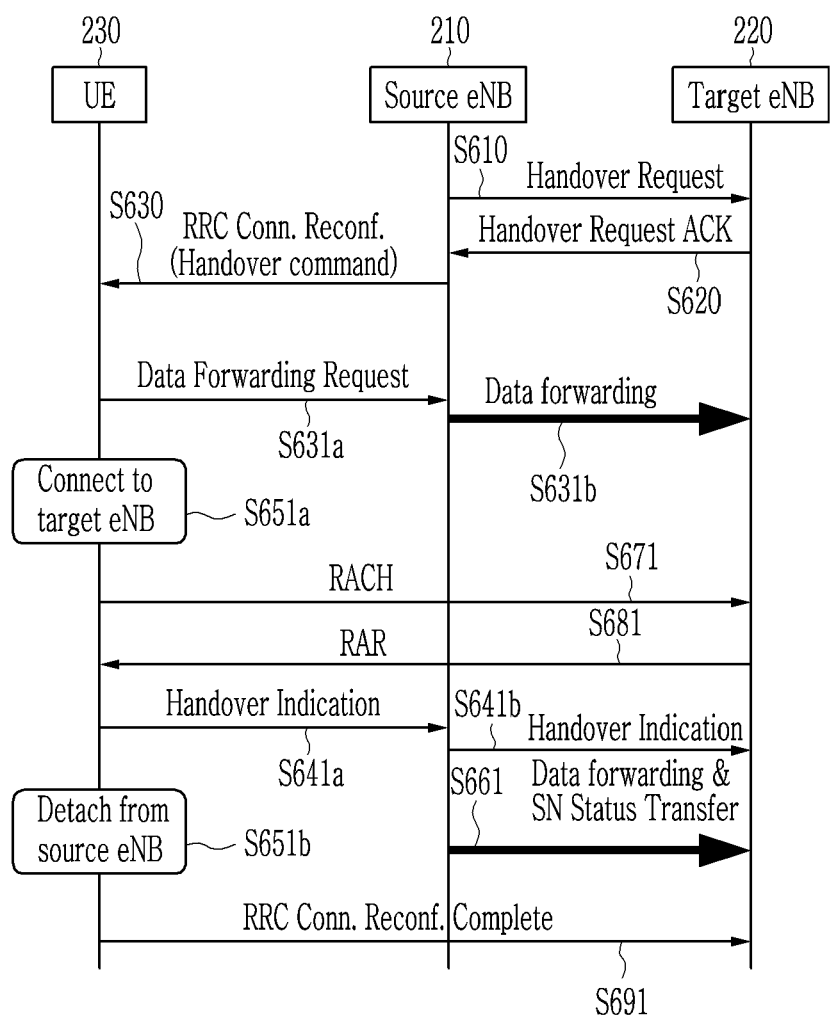
Figure 8:
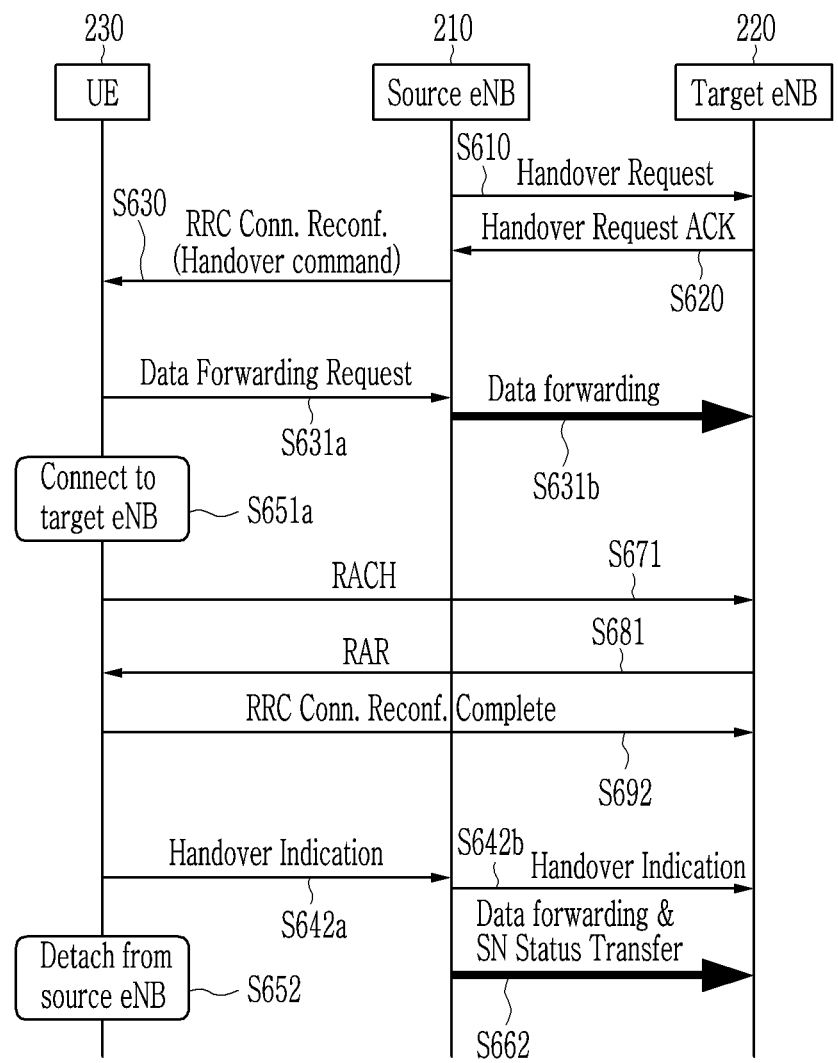

FIG. 6A, FIG. 7, and FIG. 8 each show a handover method according to an embodiment of the present invention.

Referring to FIG. 6A, a source eNB 210 transmits a handover request message to a target eNB 220 (S610). In some embodiments, a handover decision procedure may be performed before the handover request message is transmitted. In one embodiment, the handover may be decided by the source eNB 210 based on a UE measurement results as described with reference to FIG. 4 (S405, S410, and S415). In some embodiments, the handover request message may include necessary information to prepare the handover at a target eNB 220. In some embodiments, the target eNB 220 may perform admission control depending on the received information to increase likelihood of a successful handover if resources can be granted by the target eNB 220. In some embodiments, the target eNB may configure required resources according to the received information and may reserve a UE identifier (e.g., C-RNTI (cell radio network temporary identifier)) and optionally a random access channel (RACH) preamble.

The target eNB 220 prepares the handover and transmits a handover request ACK message to the source eNB 210 (S620). In some embodiments, the handover request ACK message may include a container to be sent to the UE 230 as an RRC message to perform the handover. In one embodiment, the container may include a new UE identifier (e.g., C-RNTI), a target eNB security algorithm identifier for a selected security algorithm, a dedicated RACH preamble, and possibly some other parameters. The source eNB 210 after the handover preparation with the target eNB 220 transmits a handover command to the UE 230 to instruct the UE 230 to perform the handover. The handover command may be delivered through an RRC message, i.e., an RRC connection reconfiguration message. In some embodiments, the RRC connection reconfiguration message may include mobility control information. In one embodiment, the RRC connection reconfiguration message may include necessary parameters such as the new UE identifier (e.g., C-RNTI), the target eNB security algorithm identifier, and the dedicated RACH preamble. In some embodiments, the connection to the source eNB 210 may be maintained until the UE 230 executes an initial uplink transmission to the target eNB 220.

The UE 230 decides a time point of a handover execution while maintaining a connection to the source eNB 210, and executes the handover based on the time point of the handover execution. In some embodiments, in a case where the UE 230 is able to connect to only a single eNB, the UE 230 transmits a handover indication message to the source eNB 210 while maintaining the connection to the source eNB 210 (S640a), and executes the handover (S650). After transmitting the handover indication message, the UE 230 detaches from the source eNB 210 by disconnecting the connection to the source eNB 210 and initiates a connection to the target eNB (S650). In one embodiment, the UE 230 may transmit the handover indication message at the time point of the handover execution. For example, the UE 230 may decide the time point of the handover execution by considering a physical random access channel (PRACH) configuration. In some embodiments, the UE 230 may disconnect the connection to the source eNB 210 after receiving an ACK on the handover indication message from the source eNB 210. In this case, the source eNB 210 may decide a time point at which the UE 230 transmits the ACK on the handover indication message as a time point of the handover by the UE 230.

In another embodiment, in a case where the UE 230 does not receive a response, i.e., the ACK, on the handover indication message, the UE 230 may disconnect the connection to the source eNB 210 regardless of the response on the handover indication message. In yet another embodiment, in a case where the UE 230 is unable to transmit the handover indication message due to poor channel condition, the UE 230 may execute the handover to the target eNB 220 immediately (i.e., the UE 230 may immediately disconnect the connection to the source eNB 210 at the time point of the handover execution). In this case, the source eNB 210 may estimate the time point of the handover by the UE 230 based on the handover command transmitted to the UE 230. For example, when there is no data, control information, or signal received from the UE 230 during a predetermined time after transmitting the handover command to the UE 230, the source eNB 210 may determine that the UE 230 executed the handover.

In some embodiments, the source eNB 210 receiving the handover indication message may transmit the handover indication message to the target eNB 220 to notify an immediate handover execution of the UE (S640b).

The source eNB 210 receiving the handover indication message may stop data transmission to the UE 230 and initiate data forwarding to the target eNB 220 (S660). In some embodiments, as soon as the source eNB 210 receives the handover indication message from the UE 230 or transmits the handover indication message to target eNB 220, the data forwarding may be initiated. Further, the source eNB 210 transmits an SN status transfer message to the target eNB 220 (S660). In some embodiments, SN status transfer message may include values of sequence numbers of packets to be transmitted to the UE 230 and packets to be received from the UE 230. In one embodiment, the SN status transfer message may include an uplink PDCP SN receiver status and a downlink PDCP SN transmitter status.

Next, after executing the handover by performing an access procedure, for example, a random access procedure, to connect to the target eNB 220 (S670 and S680), the UE 230 transmits a handover complete message to the target eNB 220 (S690). The handover complete message may be transmitted through an RRC connection reconfiguration complete. In some embodiments, in order to access the target eNB 220, the UE 230 may perform synchronization to the target eNB 220 and access to the target eNB 220 via an RACH (S670). The target eNB 220 may transmit uplink allocation and timing advance in an RACH response (RAR) (S680).

In some embodiments, after the handover complete message is transmitted to the target eNB 220, a handover complete procedure may be performed among the source eNB 210, the target eNB 220, an MME, and a gateway. In one embodiment, the handover complete procedure (S460, S465, S470, S475, S480, S485, S490, and S495) may be performed as described with reference to FIG. 4.

As such, since the source eNB 210 does not stop the data transmission immediately after the handover command but stops the data transmission after receiving the handover indication transmitted after the UE decides the time point of the handover execution, the handover interruption time from a time point at which the UE receives the handover command to a time point at which the UE decides the time point of handover execution can be eliminated.

Referring to FIG. 7, while being connected to and communicating with one eNB, a UE 230 is able to perform an access procedure to the other eNB. In this case, after receiving a handover command (S630), the UE 230 may transmit a data forwarding request message to a source eNB 210 while maintaining a connection to the source eNB 210 (S631a). In one embodiment, the UE 230 may transmit the data forwarding request message at a time point at which the UE 230 performs the access procedure, i.e., a random access procedure, to the target eNB 220. The source eNB 210 receiving the data forwarding request message initiates data forwarding to the target eNB 220 and continues performing data transmission to the UE 230 (S631b).

After transmitting the data forwarding request message, the UE 230 initiates a connection to the target eNB 220 (S651a). The UE 230 decides a time point of a handover execution and executes the handover by performing the access procedure, for example, the random access procedure, to the target eNB 220 at the time point of the handover execution (S671 and S681). After the access procedure is completed, the UE 230 transmits a handover indication message to the source eNB 210 (S641a). In some embodiments, the source eNB 210 receiving handover indication message may transfer the handover indication message to the target eNB 220 (S641b). The source eNB 210 receiving the handover indication message continues the data forwarding and stops the data transmission to the UE 230 (S661). Further, the source eNB 210 transmits an SN status transfer message to the target eNB 220 (S661). In another embodiment, the UE may transmit the handover indication message to the source eNB 210 immediately before initiating the access procedure.

After transmitting the handover indication message, the UE detaches from the source eNB 210 by disconnecting the connection to the source eNB 210 (S651b). Further, the UE 230 transmits a handover complete message to the target eNB 220 in accordance with completion of the access procedure (S691). The handover complete message may be transmitted through an RRC connection reconfiguration complete message.

In some embodiments, the data forwarding request procedure (S631a and S631b) may be omitted. For example, the data forwarding request procedure may be omitted when there is little interface delay between eNBs. In this case, the data forwarding may be initiated after the source eNB 210 receives the handover indication message.

In some embodiments, remaining operations may be performed as described with reference to FIG. 6A.

As such, since the UE 230 disconnects the connection to the source eNB 210 after completing the access procedure, the data interruption time can be eliminated.

Referring to FIG. 8, in some embodiments, a UE 230 is able to be connected to and communicate with two or more eNBs. In this case, differently from an embodiment described with reference to FIG. 7, after the UE 230 transmits a handover complete to a target eNB 220 in accordance with completion of a handover execution (S692), the UE 230 may transmit a handover indication message to a source eNB 210 (S642a). The handover complete may transmit through an RRC connection reconfiguration complete message. In other words, when the handover execution is completed and the UE 230 first receives data from the target eNB 220, the UE 230 may transmit a handover indication message to the source eNB 210. In some embodiments, the source eNB 210 receiving the handover indication message may transfer the handover indication message to the target eNB 220 (S642b). After transmitting the handover indication, the UE detaches from the source eNB 210 by disconnecting a connection to the source eNB 210 (S652).

The source eNB 210 receiving the handover indication continues data forwarding to the target eNB 220 and stops data transmission to the UE (S662). Further, the source eNB 210 transmits an SN status transfer message to the target eNB 220 (S662). In another embodiment, the UE may transmit the handover indication to the source eNB 210 immediately before initiating the random procedure. In yet another embodiment, the UE may transmit the handover indication to the source eNB 210 immediately before transmitting the RRC connection reconfiguration complete message to the target eNB.

In some embodiments, remaining operations may be performed as described with reference to FIG. 6A and FIG. 7.

As such, since the UE 230 disconnects the connection to the source eNB 210 after completing the access procedure, the data interruption time can be eliminated.

In some embodiments, the SN status transfer message may include an uplink SN status transfer message indicating a status of uplink data and a downlink SN status transfer message indicating a status of downlink data.

In one embodiment, in FIG. 7 or FIG. 8, the source eNB 210 may transmit the uplink SN status transfer message (S631b) when forwarding data to target eNB 220 after receiving the data forwarding request message (S631a). Further, the source eNB 210 may transmit the downlink SN status transfer message to the target eNB 220 (S661 or S662) after receiving the handover indication message (S641 or S642) or after receiving an end marker.

In another embodiment, in a case where a procedure of transmitting the data forwarding request message is skipped in FIG. 7 or FIG. 8, the source eNB 210 may transmit the uplink SN status transfer message (S661 or S662) when forwarding data to the target eNB 220 after receiving the handover indication message (S641 or S642). Further, the source eNB 210 may the downlink SN status transfer message to the target eNB 220 (S661 or S662) after receiving the handover indication message (S641 or S642) or after receiving the end marker.

Hereinafter, as described with reference to FIG. 6A, FIG. 7, or FIG. 8, a handover (HO) in which a UE 230 maintains a connection to a source eNB 210 until a predetermined time point without disconnecting the connection after receiving a handover command message is referred to as a "Make-Before-Break HO".

Next, variations of embodiments described with reference to FIG. 6A, FIG. 7, and FIG. 8 are described with reference to FIG. 6B, FIG. 6C, FIG. 6D, and FIG. 6E. While variations of a handover method shown in FIG. 6A are described in FIG. 6B, FIG. 6C, FIG. 6D, and FIG. 6E, such variations can be applied to embodiments described with reference to FIG. 7 and FIG. 8, and can be also applied to variations described with reference to FIG. 6B, FIG. 6C, FIG. 6D, and FIG. 6E.

FIG. 6B, FIG. 6C, FIG. 6D, and FIG. 6E each show a handover method according to another embodiment of the present invention.

Figure 6B:
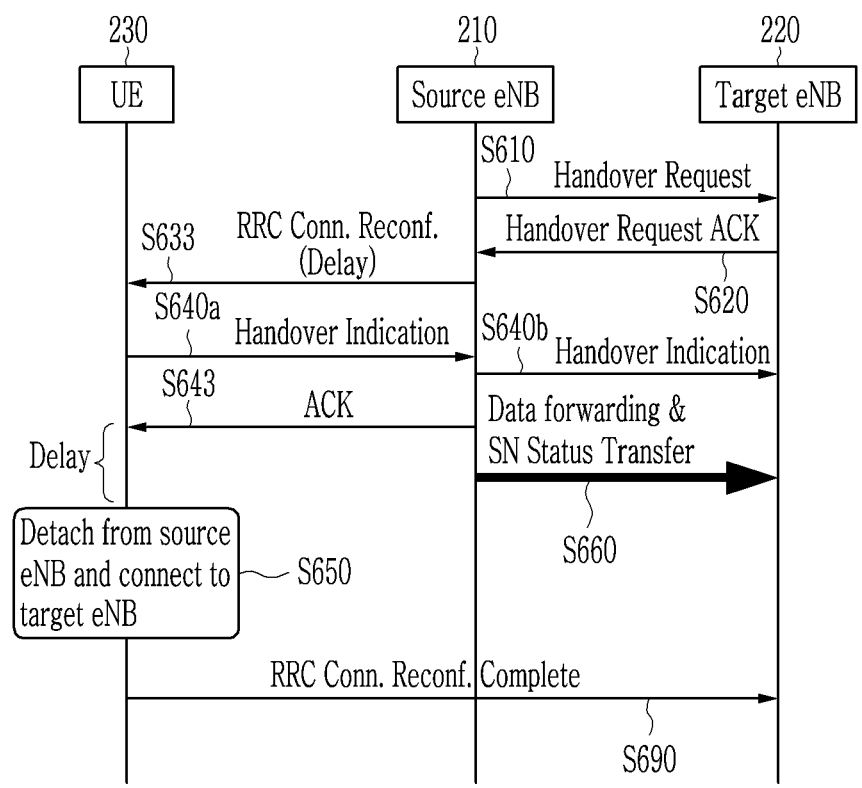

In some embodiments, in an embodiment described with reference to FIG. 6A, FIG. 7, or FIG. 8, a random access procedure (S670 and S680 or S671 and S681) may be omitted as shown in FIG. 6B. In this case, a UE 230 may synchronize to a target eNB 220 and access the target eNB 220 without the random access procedure. In one embodiment, the random access procedure may be omitted when the UE 230 knows timing advance in advance or accuracy of the timing advance is not a problem. In another embodiment, the random access procedure may be omitted when the UE 230 calculates the timing advance of a target cell in advance through pre-synchronization. In yet another embodiment, the random access procedure may be omitted when the UE 230 estimates the timing advance of the target cell in accordance with downlink reception of a source cell and the target cell. As such, when the random access procedure is omitted, a data interruption time that can occur due to the random access procedure can be eliminated. Hereinafter, a handover that does not perform a random access procedure is referred to as a "RACH-less HO."

In some embodiments, in order to notify RACH-less HO, a handover command, i.e., an RRC connection reconfiguration message may include information indicating that the random access procedure is not needed.

In some embodiments, if RACH-less HO is configured, a handover request ACK message, for example, a container included in the handover request ACK message may include timing advance indication. For example, the timing advance indication is information for indicating timing advance of a target eNB 220, and may indicate whether timing advance to be used by the UE 230 is correct (for example, timing advance of a source eNB 210 is equal to the timing advance of the target eNB 220, or whether the timing advance of the target eNB 220 is zero. In this case, the timing advance indication may be transferred from the source eNB 210 to the UE 230 through an RRC connection reconfiguration message.

In some embodiments, if RACH-less HO is configured, the target eNB 220 may transmit uplink allocation to the UE 230 after receiving a handover indication message from the source eNB 210.

On the other hand, as described with reference to FIG. 4, the target eNB 220 transmits data to the UE 230 or the gateway 240 after receiving a handover complete, i.e., an RRC connection reconfiguration complete message from the UE 230. Therefore, if the target eNB 220 transmits the data before receiving the handover complete, a delay (e.g., 6 ms) required for the UE 230 to transmit the handover complete can be further reduced. For this, in some embodiments, the handover command, i.e., the RRC connection reconfiguration message may include a typical data forwarding delay value from the source eNB 210 to the target eNB 220 (S633), as shown in FIG. 6B. For example, the data forwarding delay value may be an X2 delay on an X2 interface. In this case, a time point of a handover execution may be after the typical data forwarding delay after the UE 230 receives an ACK on a handover indication message. In other words, after transmitting the handover indication message and receiving the ACK on the handover indication message (S643), the UE 230 can exchange data while maintaining a connection to the source eNB 210 during the data forwarding delay. Then, the source eNB 210 can continue to transmit data to the UE 230 while forwarding data to the target eNB 220. Further, if there are data forwarded from source eNB 210, the target eNB 220 can transmit the data to the UE 230 immediately.

On the other hand, when transmitting data forwarded from the source eNB 210 to the UE 230, the target eNB 220 may transmit duplicated data to the UE 230 since the target eNB 220 does not know an exact downlink receiver status of the UE 230. In order to eliminate the data duplication, the target eNB 210 may transmit data to the UE 230 after receiving a downlink receiver status from the UE 230. In this case, a data interruption time while the UE 230 accesses the target eNB 210 and transmits the downlink receiver status may occur. If the target eNB 210 transmits data to the UE 230 before receiving the downlink data status in order to eliminate the data interruption time, the data duplication may occur since the target eNB 220 does not know an exact downlink receiver status of the UE 230.

Figure 6C:
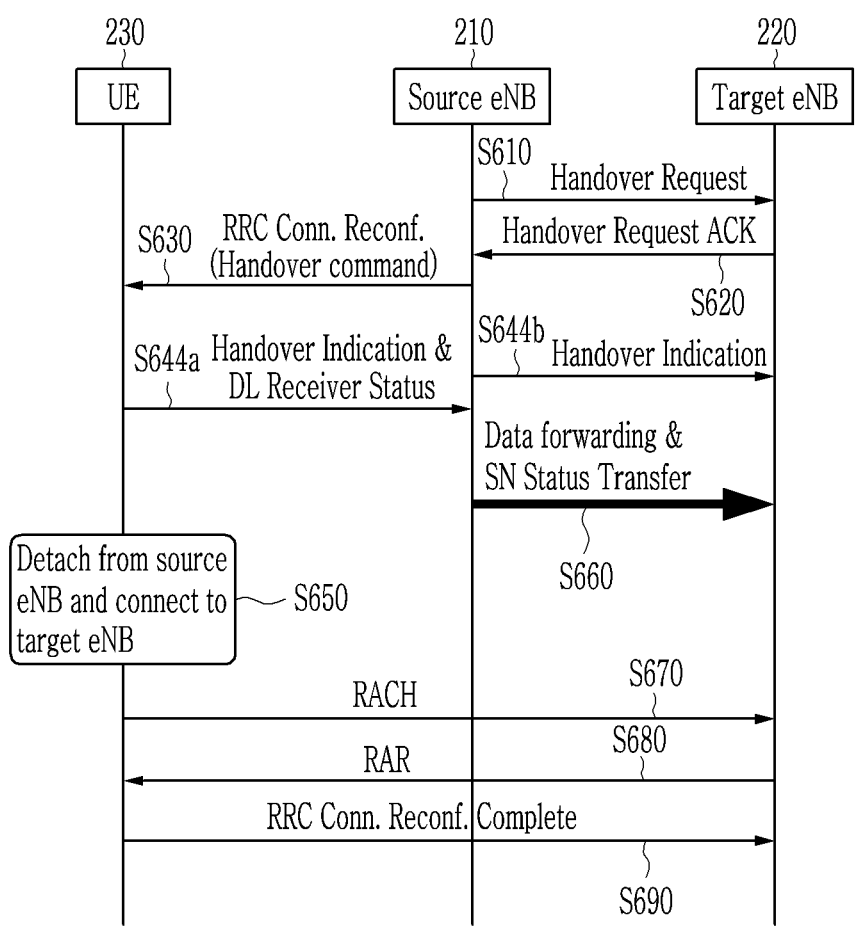

Accordingly, in some embodiments, the UE 230 may transmit the downlink receiver status of the UE 230 to the source eNB 210 when transmitting a handover indication message (S644a), as shown in FIG. 6C. The source eNB 210 receiving the downlink receiver status of the UE 230 may transfer it to the target eNB 220 when transferring the handover indication message (S644b). In one embodiment, the handover indication message may include the downlink receiver status of the UE. In another embodiment, the downlink receiver status may be transmitted through a separate message.

The downlink receiver status may indicate a receiver status of downlink data, for example, a downlink PDCP SDU in the UE 230. The source eNB 210 may forward to the target eNB 220 only data which are needed to be retransmitted to the UE 230 in accordance with the downlink receiver status transmitted by the UE 230. Then, since the target eNB 220 can transmit to the UE 230 only data which are needed to be retransmitted in accordance with the downlink receiver status of the UE, the data duplication and the data interruption time can be eliminated.

In one embodiment, the downlink receiver status may be a downlink receiver status of E-RABs for which PDCP status preservation applies, and may be transmitted through an RLC (radio link control) status PDU or a PDCP status report message.

In some embodiments, the source eNB 210 may transmit an uplink receiver status when transmitting an ACK on a handover indication message to the UE 230. The uplink receiver status may indicate a receiver status of uplink data, for example, an uplink PDCP SDU in the source eNB 210. The UE 230 may transmit to the target eNB 220 data which are needed to be retransmitted in accordance with the uplink receiver status transmitted by the source eNB 210.

In one embodiment, the uplink receiver status may be an uplink receiver status of E-RABs for which PDCP status preservation applies, and may be transmitted through an RLC status PDU or a PDCP status report message.

As in FIG. 6B, a random access procedure may be omitted in the handover method described with reference to FIG. 6C.

On the other hand, in an embodiment described with reference to FIG. 6A, FIG. 6B, FIG. 6C, FIG. 7, or FIG. 8, when the UE 230 transmits the handover indication message to source eNB 210, the source eNB 210 may allocate an uplink resource for the UE 230 to transmit the handover indication message. In order to receive allocation of the uplink resource, the UE 230 may transmit a scheduling request (SR) to the source eNB 210, and the source eNB 210 may allocate the uplink resource to the UE through uplink grant of a downlink control channel. Since there is an error probability of the downlink control channel at the cell boundary and it takes time for the SR procedure, there may be a problem in quickly transmitting handover signaling messages.

Figure 6D:
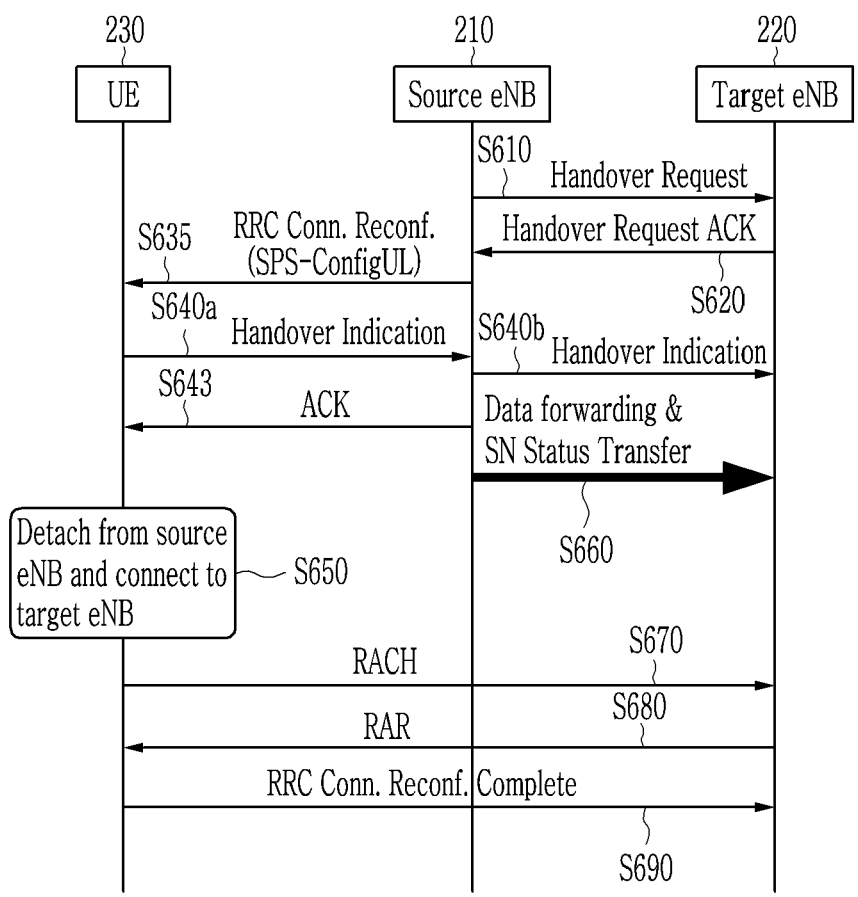

In some embodiments, a handover indication message may be transmitted by using a semi-persistent scheduling (SPS) resource. For this, as shown in FIG. 6D, the source eNB 210 may configure an uplink SPS resource by transmitting uplink SPS configuration (SPS-ConfigUL) information when transmitting a handover command, i.e., an RRC connection reconfiguration message (S635). In one embodiment, the RRC connection reconfiguration message may include the SPS-ConfigUL information. The UE 230 receiving the SPS-ConfigUL information may transmit the handover indication message on an SPS resource indicated by the SPS-ConfigUL. As such, since a procedure for allocating the uplink resource to the UE 230 through the SR procedure is not performed, the UE 230 can quickly transmit the handover indication message.

In one embodiment, the SPS-ConfigUL information may follow SPS-ConfigUL defined in SPS-Config information element of 3GPP TS 36.331.

In one embodiment, the source eNB 210 may activate the SPS-ConfigUL to allow the UE 230 to use the uplink SPS resource. The source eNB 210 may explicitly activate the SPS-ConfigUL through a downlink assignment. The downlink assignment may be transmitted through a downlink control channel, for example, a physical downlink control channel. In this case, upon receiving the RRC connection reconfiguration message and the downlink assignment, the UE 230 may regard that the uplink SPS resource is activated and transmit the handover indication message using the uplink SPS resource. In another embodiment, the source eNB 210 may implicitly activate the SPS-ConfigUL when transmitting the RRC connection reconfiguration message. In this case, upon transmitting the handover indication message after receiving the RRC connection reconfiguration message, the UE 230 may regard that the uplink SPS resource is activated and transmit the handover indication message using the uplink SPS resource. As such, the uplink SPS resource is not wasted by activating the uplink SPS resource at the transmission time of the handover indication message.

Figure 6E:
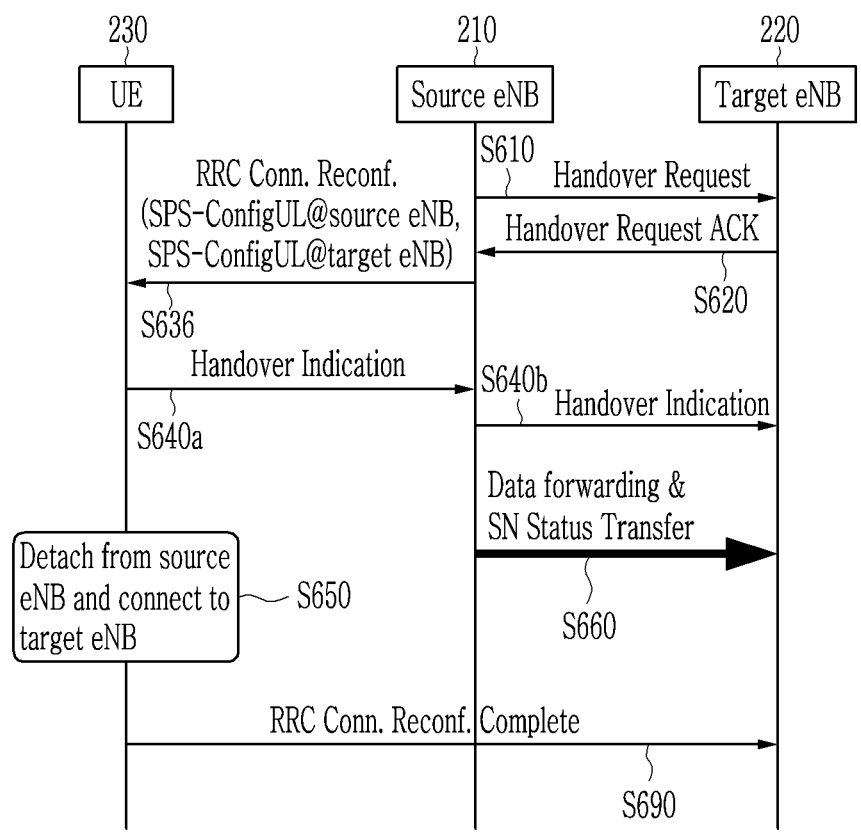

In some embodiments, if RACH-less HO is configured, as shown in FIG. 6E, the source eNB 210 may transmit SPS-ConfigUL information of the target eNB 220 when transmitting a handover command, i.e., an RRC connection reconfiguration message (S636). In one embodiment, the RRC connection reconfiguration message may include the SPS-ConfigUL information of the target eNB 220. In this case, as described with reference to FIG. 6D, the RRC connection reconfiguration message may further include SPS-ConfigUL information of the source eNB 210 for the UE 230 to transmit a handover indication message. The UE 230 receiving the SPS-ConfigUL information of the target eNB 220 may transmit a handover complete, i.e., an RRC connection reconfiguration complete message on an SPS resource indicated by the SPS-ConfigUL. As such, since a procedure for allocating the uplink resource to the UE 230 through the SR procedure or the random access procedure is not performed, the UE 230 can quickly transmit the RRC connection reconfiguration complete message.

In one embodiment, the SPS-ConfigUL information of the target eNB 220 may follow SPS-ConfigUL defined in SPS-Config information element of 3GPP TS 36.331.

In one embodiment, the target eNB 220 may transmit the SPS-ConfigUL information of the target eNB 220 to the source eNB 210 such that the source eNB 210 can transfer the same to the UE 230. In this case, the target eNB 220 may transmit the SPS-ConfigUL information through a handover request ACK message.

In one embodiment, the target eNB 220 may activate the SPS-ConfigUL of the target eNB 220 to allow the UE 230 to use the uplink SPS resource. The target eNB 210 explicitly activate the SPS-ConfigUL of the target eNB 210 through a downlink assignment. In another embodiment, the target eNB 220 may implicitly activate the SPS-ConfigUL of the target eNB 210 when receiving the handover indication message from the source eNB 210.

Next, embodiments for reducing a data interruption time due to a handover (i.e., SeNB change) in dual connectivity configuration are described with reference to FIG. 9 to FIG. 15.

Figure 9:
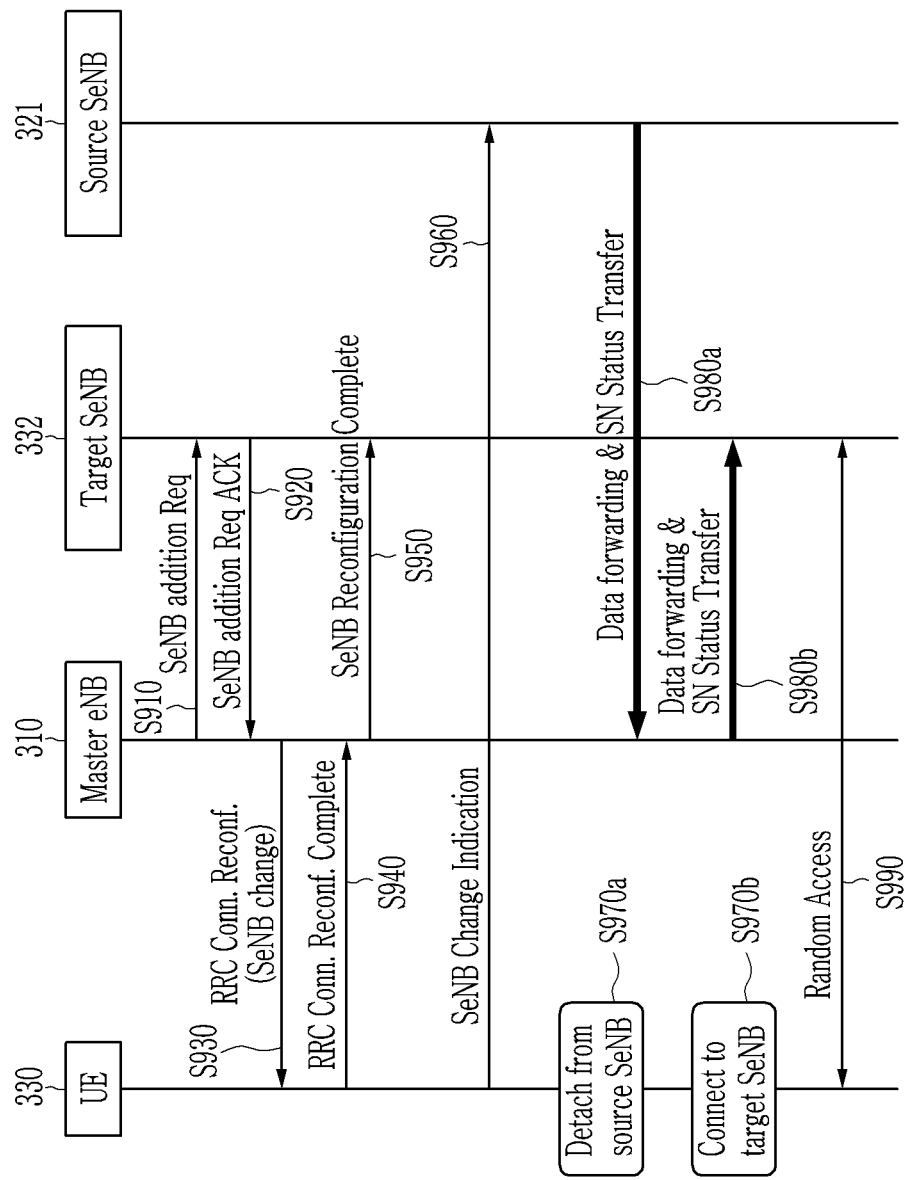
FIG. 9, FIG. 10, FIG. 11, FIG. 12A, FIG. 12B, FIG. 12C, FIG. 12D, FIG. 13, FIG. 14, and FIG. 15 each show a handover method, in particular a SeNB change method, according to another embodiment of the present invention.
Figure 10:
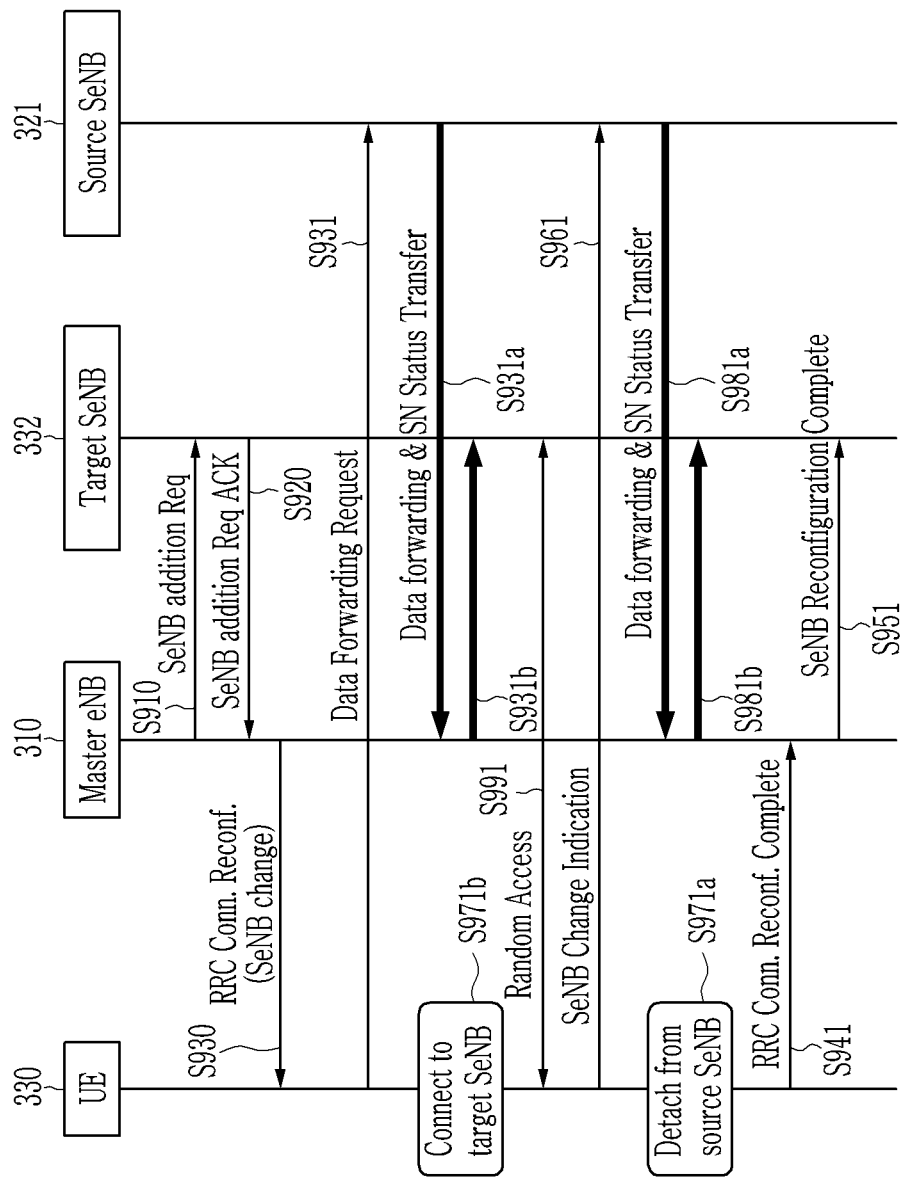
Figure 11:
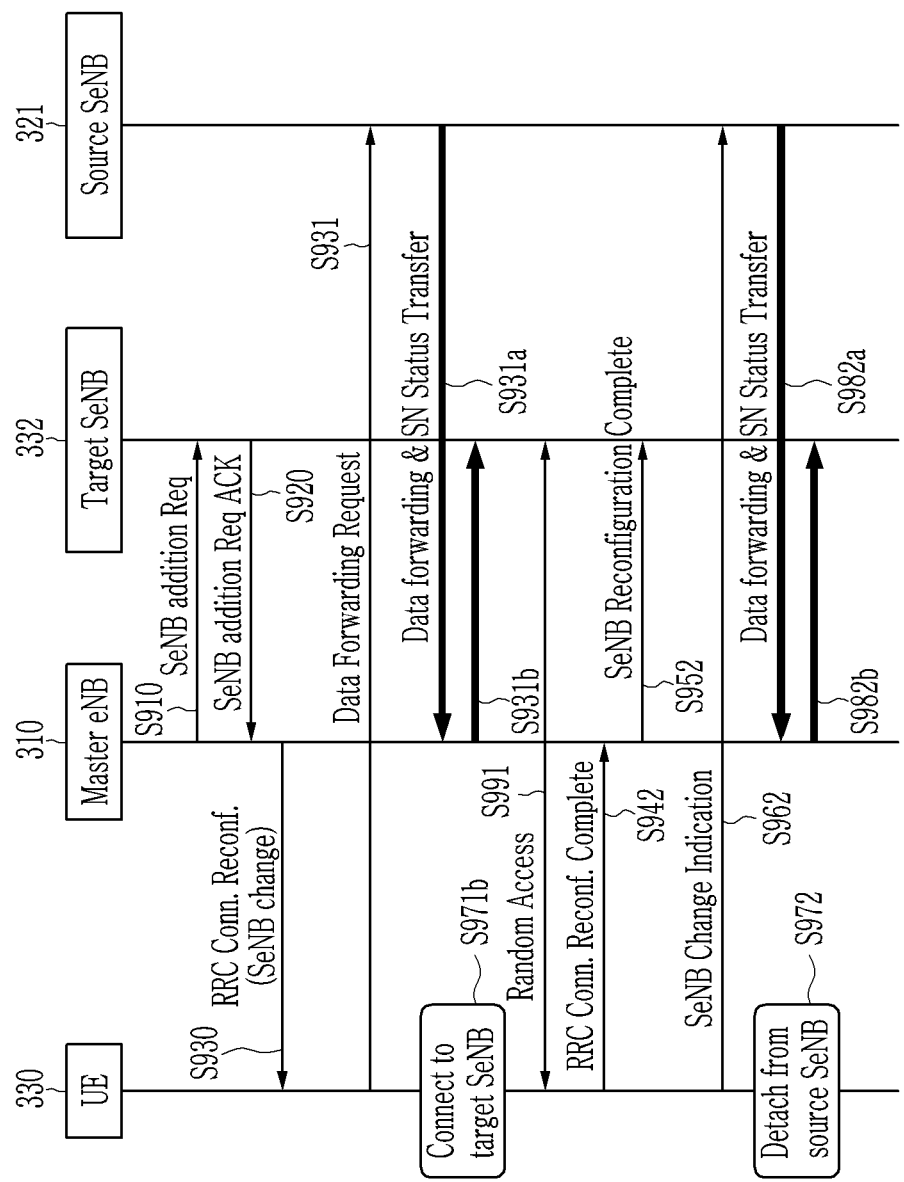

FIG. 9, FIG. 10, and FIG. 11 each show a handover method according to another embodiment of the present invention.

In some embodiments, a UE 330 is able to transmit a control message to a source SeNB 321. In this case, a handover method to be described with reference to FIG. 9 to FIG. 11 may be used. For example, the UE 330 may transmit the control message using an L2 MAC control element control message or may transmit the control message using an L3 message.

Referring to FIG. 9, a master eNB 310 transmits a SeNB addition request message to a target SeNB 322 (S910). The target SeNB 322 transmits a SeNB addition request ACK message to the master eNB 310 (S920). In some embodiments, the SeNB addition request message may include secondary cell group (SCG) configuration of an old SeNB. In some embodiments, if forwarding is needed, the target SeNB 322 may provide forwarding addresses to the master eNB (S920).

Next, the master eNB 310 indicates a new SeNB configuration (i.e., commands a SeNB change) by transmitting an RRC connection reconfiguration to a UE 330, in order for the UE 330 to apply the new SeNB configuration (S930). After receiving the RRC connection reconfiguration message, the UE 330 maintains a connection to source SeNB 321 until executing the SeNB change. In some embodiments, the source SeNB 321 may continue transmitting downlink data to the UE 330 until the UE 330 executes initial uplink transmission to the target SeNB 322.

The UE 330 transmits an RRC connection reconfiguration complete message to the master eNB 310 (S940). If the RRC connection reconfiguration is successful, the master eNB 310 informs the target SeNB 322 by transmitting a SeNB reconfiguration complete message to the target SeNB 322 (S950).

The UE 330 decides a time point of a SeNB change execution while maintaining a connection to the source SeNB 321, and executes the SeNB change based on the time point of the SeNB change execution. In some embodiments, in a case where the UE 330 is able to connect to only a single SeNB, the UE 330 may transmit a SeNB change indication to the source SeNB 321 (S960) after deciding the time point of the SeNB change execution. In one embodiment, the UE 330 may transmit the SeNB change indication message at the time point of the SeNB change execution. Accordingly, the SeNB change indication message may notify an immediate SeNB change execution of the UE to the source SeNB 321. For example, the UE 330 may decide the time point of the SeNB change execution by considering a PRACH configuration of the target SeNB cell. In some embodiments, the UE 330 may disconnect the connection to the source SeNB 321 after receiving an ACK on the SeNB change indication message from the source SeNB 321. In this case, the source SeNB 321 may decide a time point at which the UE 330 transmits the ACK on the SeNB change indication message as a time point of the SeNB change by the UE 330.

In another embodiment, in a case where the UE 330 does not receive a response, i.e., the ACK, on the SeNB change indication message, the UE 330 may disconnect the connection to the source SeNB 321 regardless of the response on the SeNB change indication message. In yet another embodiment, in a case where the UE 330 is unable to transmit the SeNB change indication message due to poor channel condition, the UE 330 may execute the SeNB change to the target SeNB 322 immediately (i.e., the UE 330 may immediately disconnect the connection to the source SeNB 321 at the time point of the SeNB change execution). In this case, the source eNB 321 may estimate the time point of the SeNB change by the UE 330. For example, the source SeNB 321 may determine that the UE 330 executes the SeNB change when there is no data, control information, or signal received from the UE 330 during a predetermined time.

While it is shown in FIG. 9 that the UE 330 transmits the SeNB change indication message to the source SeNB 321 (S960) after the master eNB 310 transmits the SeNB reconfiguration complete message to the target SeNB 322 (S950), execution order of the steps S950 and S960 is not limited thereto. For example, the steps S950 and S960 may be executed simultaneously, or the step S950 may be executed after the step S960 is executed.

After transmitting the SeNB change indication message (S960), the UE 330 detaches from the source SeNB 321 by disconnecting the connection to the source SeNB 321 (S970*a*), and initiates to connect to a connection to the target SeNB 322 (S970*b*). The source SeNB 321 receiving the SeNB change indication stops data transmission to the UE 330 and starts data forwarding to the target SeNB 322 via the master eNB 310 (S980*a* and S980*b*). In some embodiments, as soon as the source SeNB 321 receives the SeNB change indication message, the data forwarding may be started. Further, the source SeNB 321 transmits an SN status transfer message to the target SeNB 322 via the master eNB 310 (S980*a* and S980*b*). In addition, in order to connect to the target SeNB 322, the UE 330 synchronizes to the target SeNB 322 and performs an access procedure, for example, a random access procedure to the target SeNB 322 (S990). While it is shown in FIG. 9 that the random access procedure is performed (S990) after the data forwarding is started (S980*a* and S980*b*), random access, execution order of the steps S980*a*, S980*b*, and S990 is not limited thereto. For example, after the steps S980*a*, S980*b*, and S990 may be executed simultaneously, the steps S980*a* and S980*b* may be executed after the S990 is executed.

In some embodiments, after the SeNB change to the target SeNB 322 is executed, a path update procedure may be performed among the master eNB 310, the source SeNB 321, the target SeNB 322, an MME, and a gateway. In one embodiment, the path update procedure (S555, S560, S565, S570, S575, and S580) may be performed as described with reference to FIG. 5.

As such, since the source SeNB 321 does not stop the data transmission to the UE 330 before the master eNB 310 transmits the RRC connection reconfiguration message but stops the data transmission after receiving the SeNB change indication transmitted after the UE 330 decides the time point of the SeNB change execution, the handover interruption time can be reduced.

Referring to FIG. 10, while being connected to and communicating with one SeNB, a UE 330 is able to perform an access procedure, for example, a random access procedure to the other SeNB. In this case, after receiving an RRC connection reconfiguration message (SeNB change command) (S930), the UE 330 may transmit a data forwarding request message to a source SeNB 321 while maintaining a connection to the source SeNB 321 (S931). In one embodiment, the UE 330 may transmit the data forwarding request message at a time point at which the UE 330 executes the random access procedure to the target SeNB 322. The source SeNB 321 receiving the data forwarding request message initiates data forwarding to the target SeNB 322 via the master eNB 310 and continues performing data transmission to the UE 330 (S931*a* and S931*b*).

After transmitting the data forwarding request message, the UE 330 initiates a connection to the target SeNB 322 (S971*b*). The UE 330 decides a time point of a SeNB change execution and executes the SeNB change by performing the random access procedure to the target SeNB 322 at the time point of the SeNB change execution (S991). After the random access procedure is completed, the UE 330 transmits a SeNB change indication message to the source SeNB 321 (S961). The source SeNB 321 receiving the SeNB change indication message stops the data transmission to the UE 330 and continues the data forwarding to the target SeNB 322 (S981*a* and S981*b*). Further, the source SeNB 321 transmits an SN status transfer message to the target SeNB 322 via the master eNB 310 (S981*a* and S981*b*). In another embodiment, the UE 330 may transmit the SeNB change indication message to the source SeNB 321 immediately before initiating the random access procedure.

After transmitting the SeNB change indication, the UE 330 detaches from the source SeNB 321 by disconnecting the connection to the source SeNB 321 (S971*a*). Further, the UE 330 transmits an RRC connection reconfiguration complete message (i.e., SeNB change complete) to the master eNB 310 in accordance with completion of the access procedure (S941), and the master eNB 310 transmits a SeNB reconfiguration complete message to the target SeNB 322 (S951).

In some embodiments, remaining operations may be performed as described with reference to FIG. 9.

In some embodiments, the data forwarding request procedure (S931, S931*a*, and S931*b*) may be omitted. For example, the data forwarding request procedure may be omitted when there is little interface delay between eNBs. In this case, the data forwarding may be initiated after the source SeNB 321 receives handover indication message.

As such, since the UE 330 disconnects the connection to the source SeNB 321 after completing the access procedure, the data interruption time can be eliminated.

Referring to FIG. 11, a UE 330 is able to be connected to and communicate with two or more SeNB. In this case, differently from an embodiment described with reference to FIG. 10, after the UE 330 performs an access procedure (S991) and transmits an RRC connection reconfiguration complete message (i.e., SeNB change complete) to a master eNB 310 (S942), the UE 330 may transmit a SeNB change indication message to a source SeNB 321 (S962). The master eNB 310 receiving the connection reconfiguration complete message transmits a SeNB reconfiguration complete message to the target SeNB 322 (S952). In other words, when the SeNB change execution is completed and the UE 330 first receives data from the target SeNB 332, the UE 330 may transmit the SeNB change indication message to the source SeNB 321. After transmitting the SeNB change indication, the UE detaches from the source SeNB 321 by disconnecting a connection to the source SeNB 321 (S972). The source SeNB 321 receiving the SeNB change indication stops data transmission to the UE 330 and continues data forwarding to the target SeNB 322 (S982*a* and S982*b*). Further, the source SeNB 321 transmits an SN status transfer message to the target SeNB 322 via the master eNB 310 (S982*a* and S982*b*). In another embodiment, the UE 330 may transmit the SeNB change indication to the source SeNB 321 immediately before initiating the random procedure. In yet another embodiment, the UE 330 may transmit the SeNB change indication to the source SeNB 321 immediately before transmitting the RRC connection reconfiguration complete message to the target SeNB 322.

In some embodiments, remaining operations may be performed as described with reference to FIG. 9 and FIG. 10.

As such, since the UE 330 disconnects the connection to the source SeNB 321 after completing the access procedure, the data interruption time can be eliminated.

In some embodiments, the SN status transfer message may include an uplink SN status transfer message indicating a status of uplink data and a downlink SN status transfer message indicating a status of downlink data.

In one embodiment, in FIG. 10 or FIG. 11, the source SeNB 321 may transmit the uplink SN status transfer message (S931*a* and S931*b*) when forwarding data to the target SeNB 322 after receiving the data forwarding request message (S931). Further, the source SeNB 321 may transmit the downlink SN status transfer message to the target SeNB 322 (S981*a* and S981*b* or S982*a* and S982*b*) after receiving the SeNB change indication message (S961 or S962) or after receiving an end marker.

In another embodiment, in a case where a procedure of transmitting the data forwarding request message is skipped in FIG. 10 or FIG. 11, the source SeNB 321 may the uplink SN status transfer message (S981*a* and S981*b* or S982*a* and S982*b*) when forwarding data to the target SeNB 322 after receiving the SeNB change indication message (S961 or S962). Further, the source SeNB 321 may transmit the downlink SN status transfer message to the target SeNB 322 (S981*a* and S981*b* or S982*a* and S982*b*) after receiving the SeNB change indication message (S961 or S962) or after receiving the end marker.

In some embodiments, a UE 330 is unable to transmit a control message to a source SeNB 321. In this case, a handover method to be described with reference to FIG. 12A to FIG. 15 may be used. For example, when the UE 330 transmits the control message using an L3 message, the UE 330 is able to transmit the control message to only a master eNB 310.

FIG. 12A, FIG. 13, FIG. 14, and FIG. 15 each show a handover method according to yet another embodiment of the present invention.

Figure 12A:
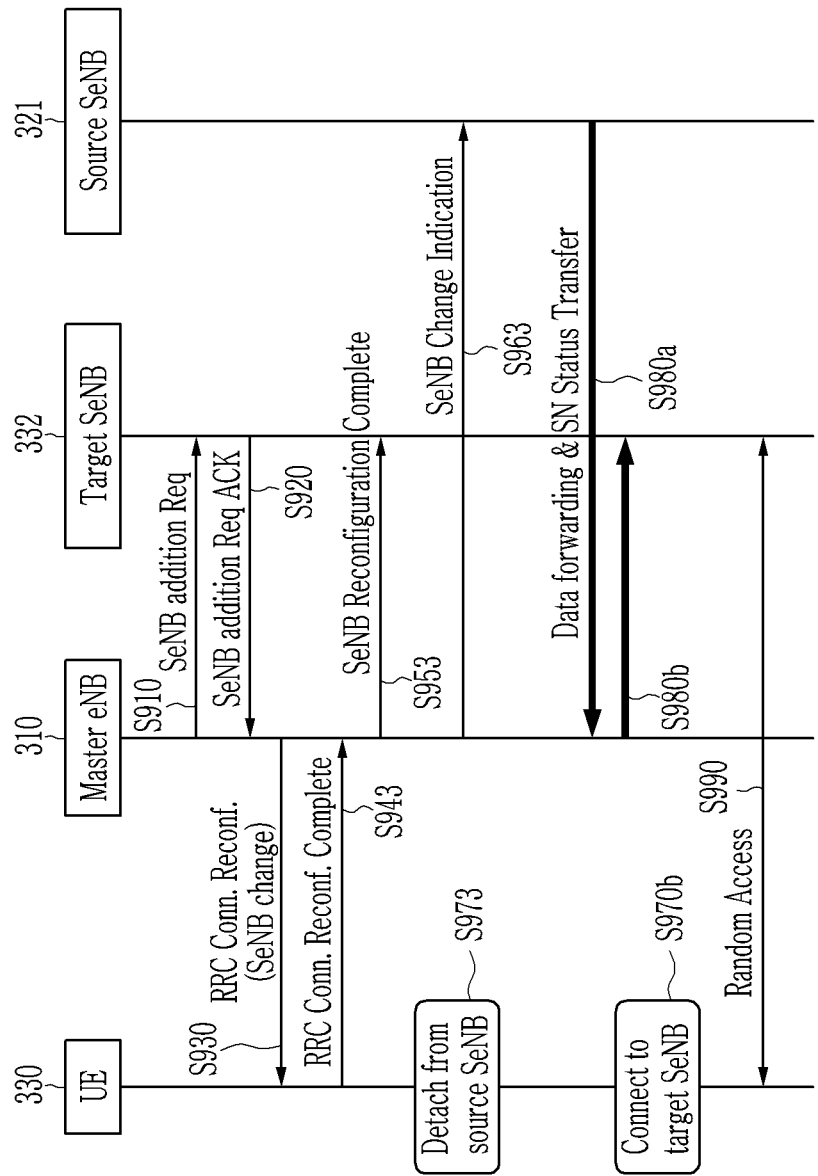

Referring to FIG. 12A, in a case where the UE 330 is able to connect to only a single SeNB, the UE 330 transmits an RRC connection reconfiguration complete message to a master eNB 310 at a time point of a SeNB change execution (S943). The master eNB 310 receiving the RRC connection reconfiguration complete message transmits a SeNB reconfiguration complete message to a target SeNB 322 (S953), and transmits a SeNB change indication message to a source SeNB 321 (S963). Accordingly, the SeNB change indication message may notify an immediate SeNB change execution of the UE to the source SeNB 321. For example, the UE 330 may decide the time point of the SeNB change execution by considering a PRACH configuration of the target SeNB cell. While it is shown in FIG. 12A that the UE 330 transmits the SeNB change indication message to the source SeNB 321 (S963) after the master eNB 310 transmits the SeNB reconfiguration complete message to the target SeNB 322 (S953), execution order of the steps S953 and S963 is not limited thereto For example, the steps S953 and S963 may be executed simultaneously, or the step S953 may be executed after the step S963 is executed.

In some embodiments, the UE 330 may transmit a SeNB change indication message to the master eNB 310. Then, the master eNB 310 receiving the SeNB change indication message from the UE 330 may transfer the same to the source SeNB 310 (S963).

After transmitting the RRC connection reconfiguration complete message (S943), the UE 330 detaches from the source SeNB 321 by disconnecting a connection to the source SeNB 321 (S970).

In some embodiments, remaining operations may be performed as described with reference to FIG. 9.

Figure 13:
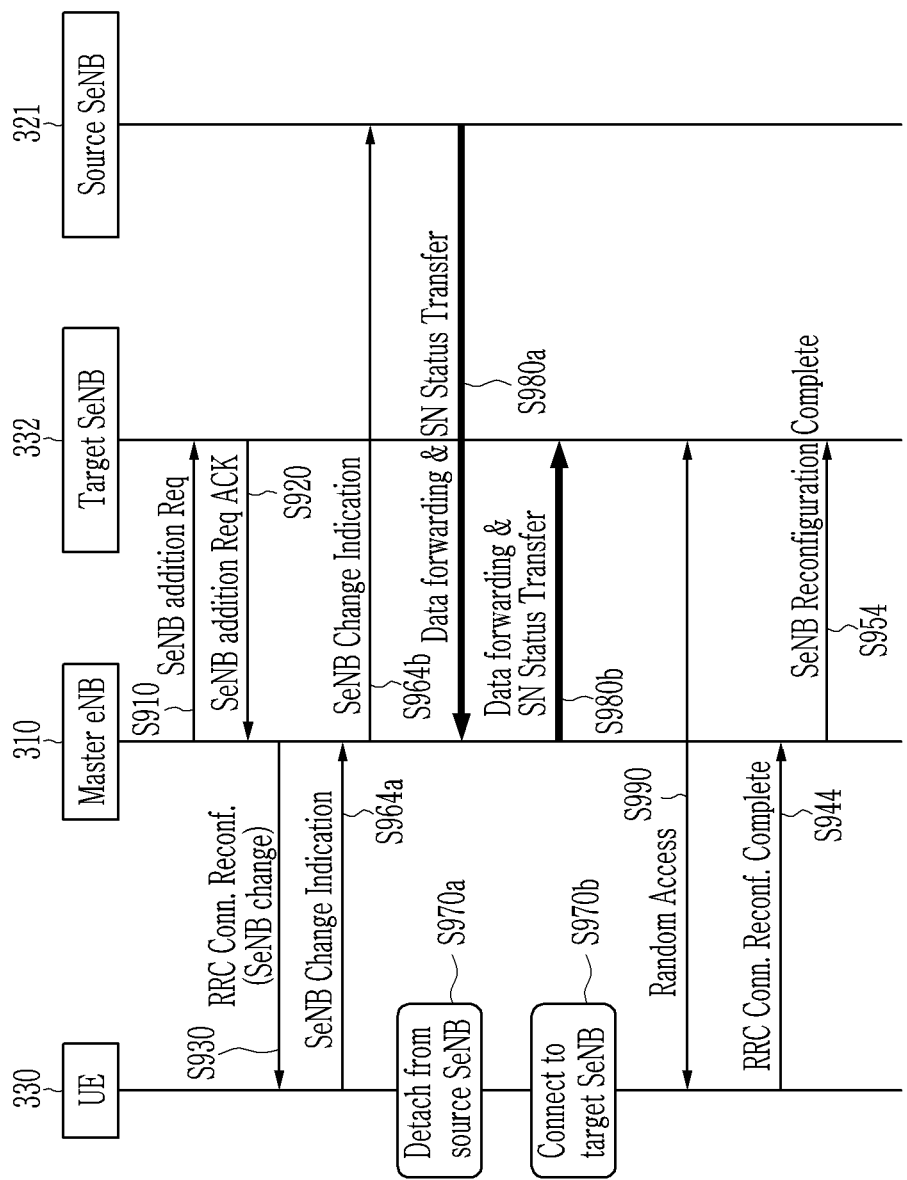

Referring to FIG. 13, in a case where the UE 330 is able to connect to only a single SeNB, the UE 330, the UE 330 transmits a SeNB change indication message to a master eNB 310 at a time point of a SeNB change execution (S964*a*), and the master eNB 310 receiving the SeNB change indication message transfers the same to a source SeNB 321 (S964*b*). Accordingly, the SeNB change indication message may notify an immediate SeNB change execution of the UE to the source SeNB 321. For example, the UE 330 may decide the time point of the SeNB change execution by considering a PRACH configuration of the target SeNB cell.

The source SeNB 321 receiving the SeNB change indication stops data transmission to the UE 330 and starts data forwarding to the target SeNB 322 via the master eNB 310 (S980*a* and S980*b*). The source SeNB 321 transmits an SN status transfer message to the target SeNB 322 via the master eNB 310 (S980*a* and S980*b*). After transmitting the SeNB change indication message (S964*a*), the UE 330 detaches from the source SeNB 321 by disconnecting a connection to the source SeNB 321 (S970*a*). Further, the UE 330 performs an access procedure, for example, a random access procedure to the target SeNB 322 (S990).

After the access procedure is completed (S990), the UE 330 transmits an RRC connection reconfiguration complete message to the master eNB 310 (S944), and the master eNB 310 receiving the RRC connection reconfiguration complete message transmits a SeNB reconfiguration complete message to the target SeNB 322 (S954).

In some embodiments, remaining operations may be performed as described with reference to FIG. 9.

As described with reference to FIG. 12A or FIG. 13, even if the UE 330 cannot transmit a control message to the source SeNB 321 directly, the UE 330 can transmit the SeNB change indication message to the source SeNB 321 via the master eNB 310. Further, since the source SeNB 321 does not stop the data transmission to the UE 330 before the master eNB 310 transmits the RRC connection reconfiguration message but stops the data transmission after the UE 330 decides the time point of the SeNB change execution, the handover interruption time can be reduced.

Figure 14:
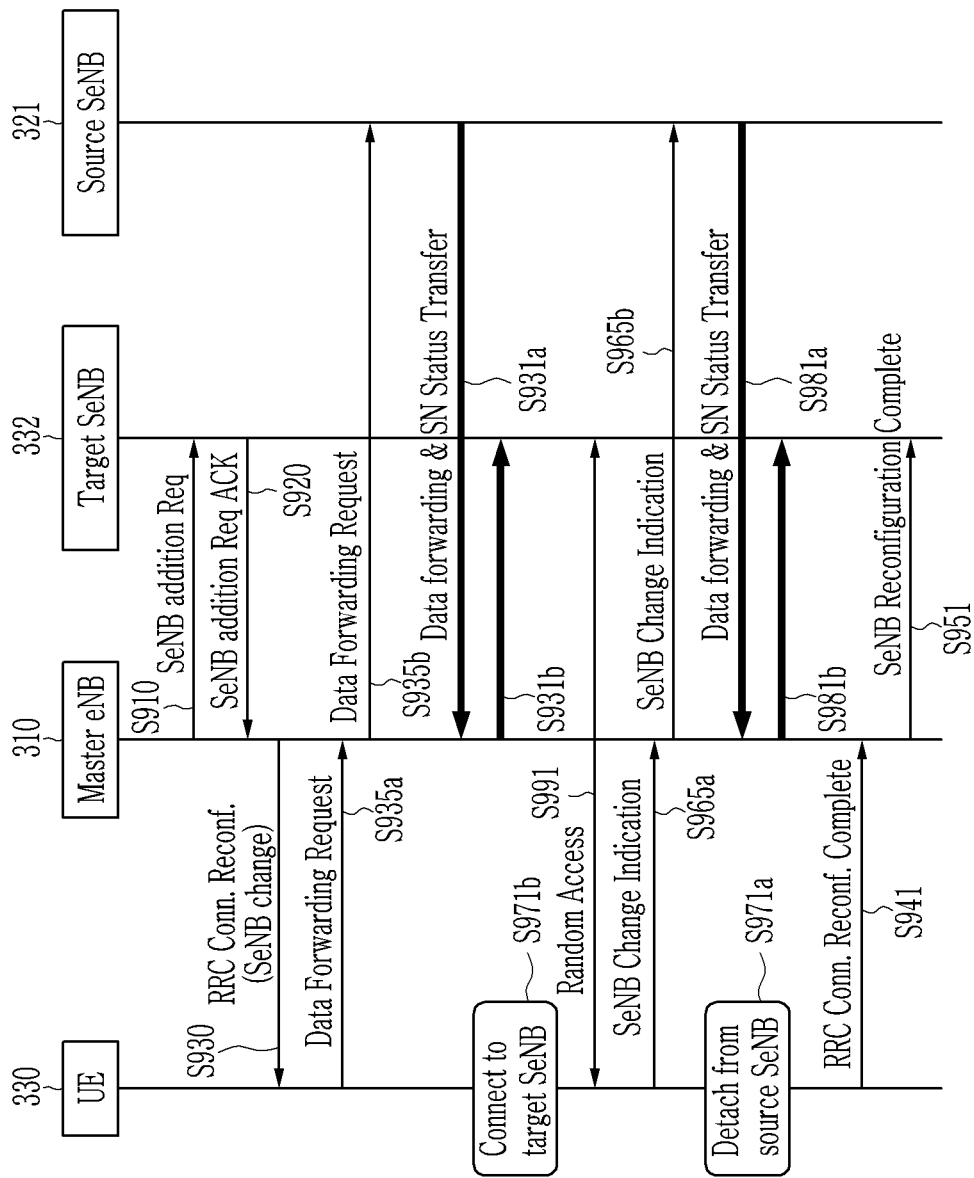

Referring to FIG. 14, while being connected to and communicating with one SeNB, a UE 330 is able to perform an access procedure, for example, a random access procedure to the other SeNB. In this case, after receiving an RRC connection reconfiguration message (SeNB change command) (S930), the UE 330 may transmit a data forwarding request message to a master eNB 310 while maintaining a connection to a source SeNB 321 (S935*a*), and the master eNB 310 receiving the data forwarding request message may transfer the data forwarding request message to the source SeNB 321 (S935*b*). In one embodiment, the UE 330 may transmit the data forwarding request message at a time point at which the UE 330 executes the random access procedure to the target SeNB 322. The source SeNB 321 receiving the data forwarding request message initiates data forwarding to the target SeNB 322 via the master eNB 310 and continues performing data transmission to the UE 330 (S931a and S931b).

After transmitting the data forwarding request message, the UE 330 executes the SeNB change by performing the random access procedure to the target SeNB 322 (S991). After the random access procedure is completed, the UE 330 transmits a SeNB change indication message to the master eNB 321 (S965a), and the master eNB 321 transfers the SeNB change indication message to the source SeNB 321 (S965b). The source SeNB 321 receiving the SeNB change indication message stops the data transmission to the UE 330 and continues the data forwarding to the target SeNB 322 (S981a and S981b). Further, the source SeNB 321 transmits an SN status transfer message to the target SeNB 322 via the master eNB 310 (S981a and S981b). In another embodiment, the UE 330 may transmit the SeNB change indication message to the source SeNB 321 immediately before initiating the random access procedure.

After transmitting the SeNB change indication, the UE 330 detaches from the source SeNB 321 by disconnecting the connection to the source SeNB 321 (S971a). In some embodiments, remaining operations may be performed as described with reference to FIG. 9 and FIG. 10.

As such, even if the UE 330 cannot transmit a control message to the source SeNB 321 directly, the UE 330 can transmit the data forwarding request message and the SeNB change indication message to the source SeNB 321 via the master eNB 310. Further, since the UE 330 disconnects the connection to the source SeNB 321 after the access procedure is completed, the data interruption time can be eliminated.

Figure 15:
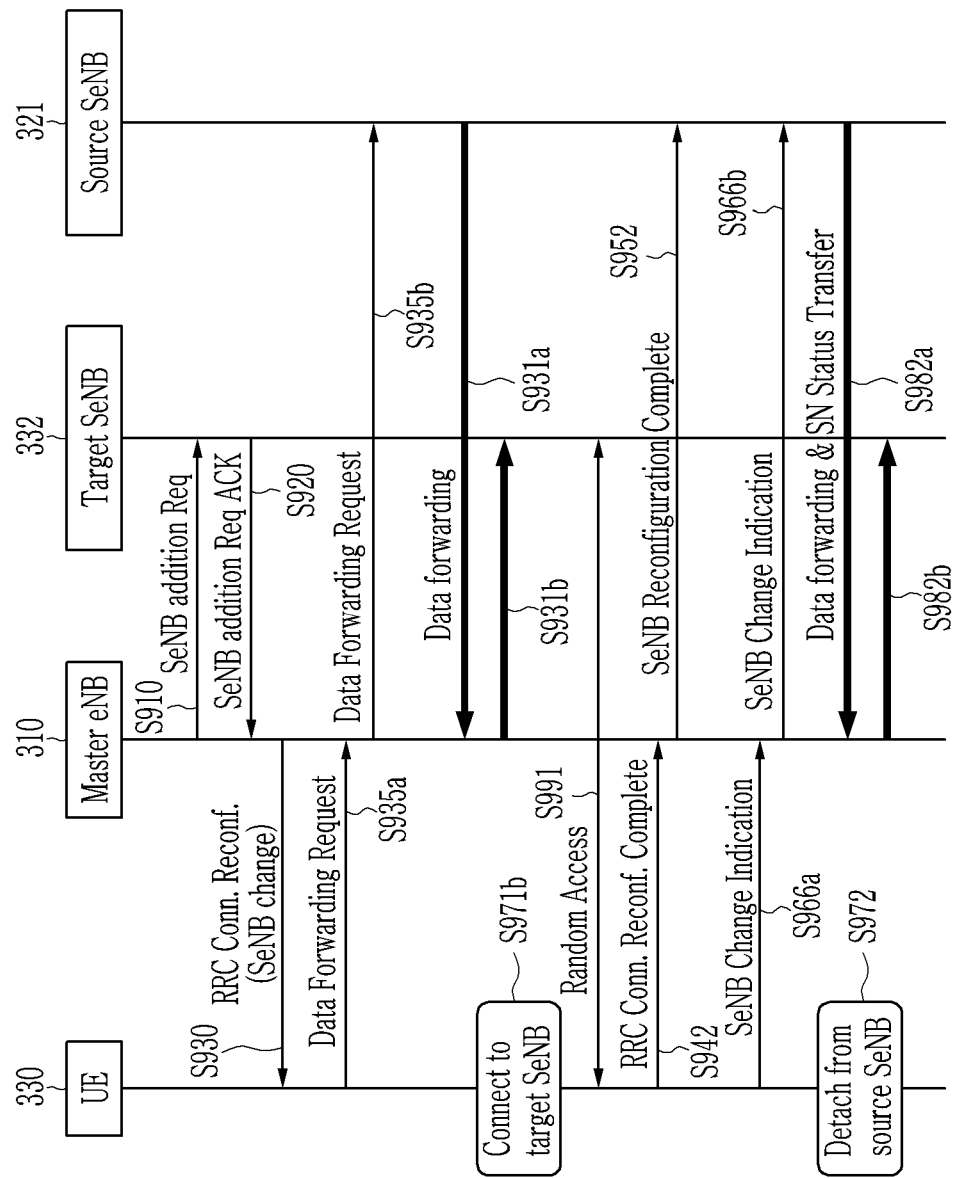

Referring to FIG. 15, a UE 330 is able to be connected to and communicate with two or more SeNB. In this case, differently from an embodiment described with reference to FIG. 14, after the UE 330 performs an access procedure (S991) and transmits an RRC connection reconfiguration complete message (i.e., SeNB change complete) to a master eNB 310 (S942), the UE 330 may transmit a SeNB change indication message to a master eNB 310 (S966a). The master eNB 310 receiving the connection reconfiguration complete message transmits a SeNB reconfiguration complete message to the target SeNB 322 (S952). In other words, when the SeNB change execution is completed and the UE 330 first receives data from the target SeNB 332, the UE 330 may transmit the SeNB change indication message to the source SeNB 321. The master eNB 310 receiving the SeNB change indication message transfers the SeNB change indication message to the source SeNB 321 (S966b). After transmitting the SeNB change indication, the UE detaches from the source SeNB 321 by disconnecting a connection to the source SeNB 321 (S972).

The source SeNB 321 receiving the SeNB change indication stops data transmission to the UE 330 and continues data forwarding to the target SeNB 322 (S982a and S982b). Further, the source SeNB 321 transmits an SN status transfer message to the target SeNB 322 via the master eNB 310 (S982a and S982b). In another embodiment, the UE 330 may transmit the SeNB change indication to the source SeNB 321 immediately before initiating the random procedure. In yet another embodiment, the UE 330 may transmit the SeNB change indication to the source SeNB 321 immediately before transmitting the RRC connection reconfiguration complete message to the target SeNB 322.

In some embodiments, remaining operations may be performed as described with reference to FIG. 9 and FIG. 10.

As such, even if the UE 330 cannot transmit a control message to the source SeNB 321 directly, the UE 330 can transmit the data forwarding request message and the SeNB change indication message to the source SeNB 321 via the master eNB 310. Since the UE 330 disconnects the connection to the source SeNB 321 after completing the access procedure, the data interruption time can be eliminated.

Hereinafter, as described with reference to FIG. 9, FIG. 10, FIG. 11, FIG. 12A, FIG. 13, FIG. 14, or FIG. 15, a SeNB change (SC) in which a UE 330 maintains a connection to a source SeNB 321 until a predetermined time point without disconnecting the connection after receiving a SeNB change command message is referred to as a "Make-Before-Break SC." Next, variations of embodiments described with reference to FIG. 9, FIG. 10, FIG. 11, FIG. 12A, FIG. 13, FIG. 14, and FIG. 15 are described with reference to FIG. 12B, FIG. 12C, and FIG. 12D. While variations of a handover method shown in FIG. 12A are described in FIG. 12B, FIG. 12C, and FIG. 12D, such variations can be applied to embodiments described with reference to FIG. 9, FIG. 10, FIG. 11, FIG. 13, FIG. 14, and FIG. 15, and can be also applied to variations described with reference to FIG. 12B, FIG. 12C and FIG. 12D.

Figure 12B:
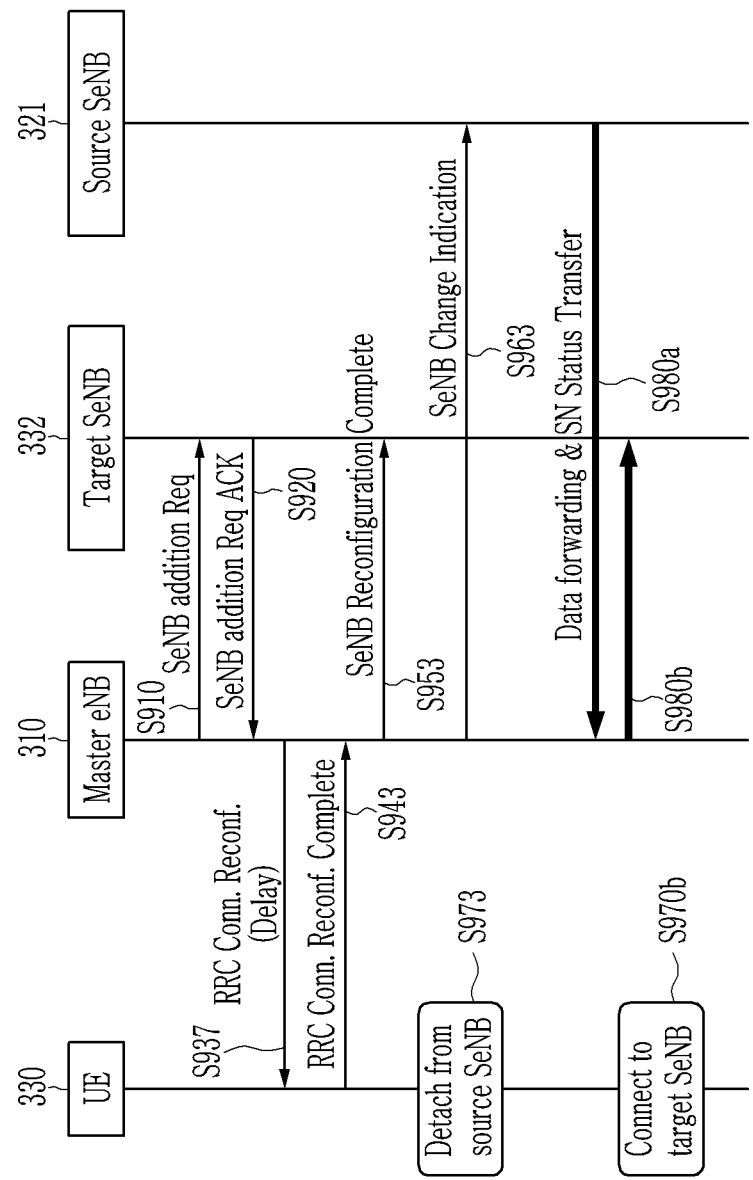
Figure 12C:
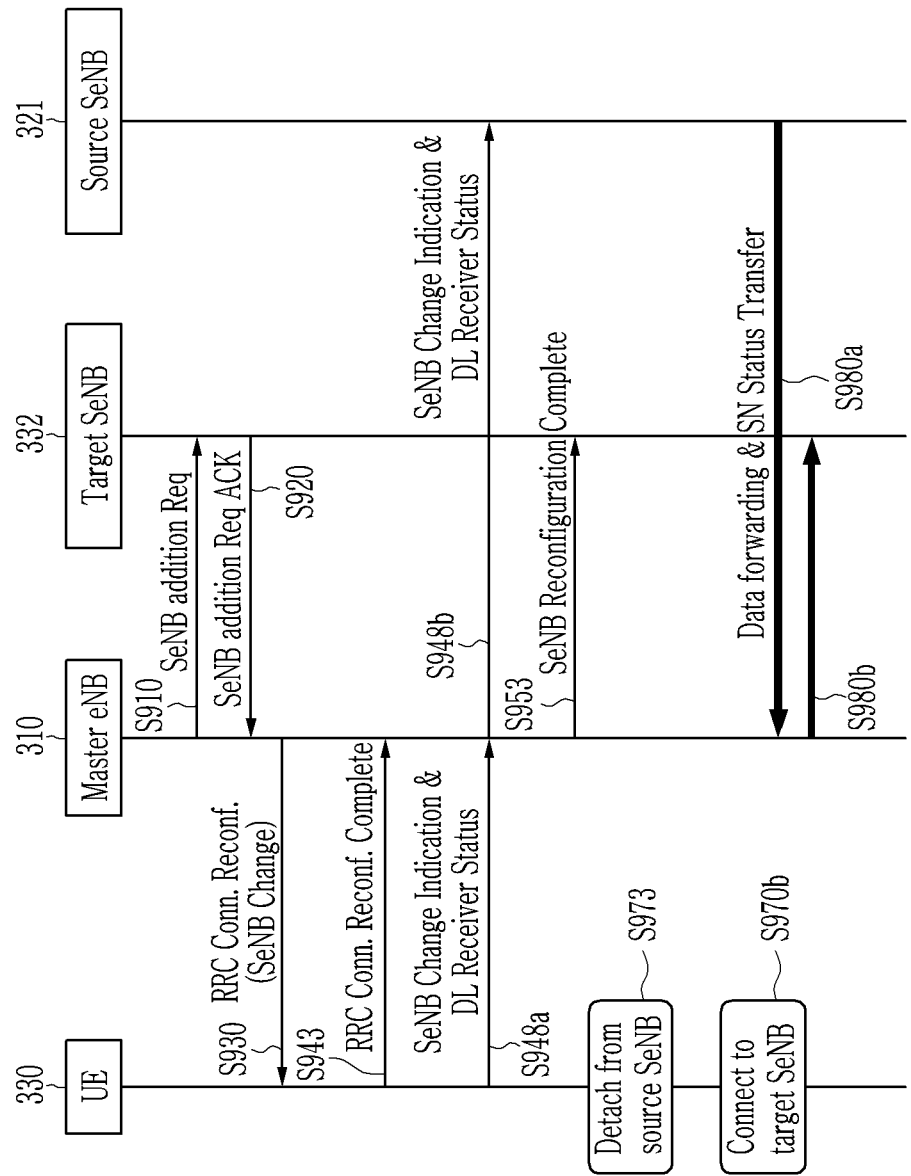
Figure 12D:
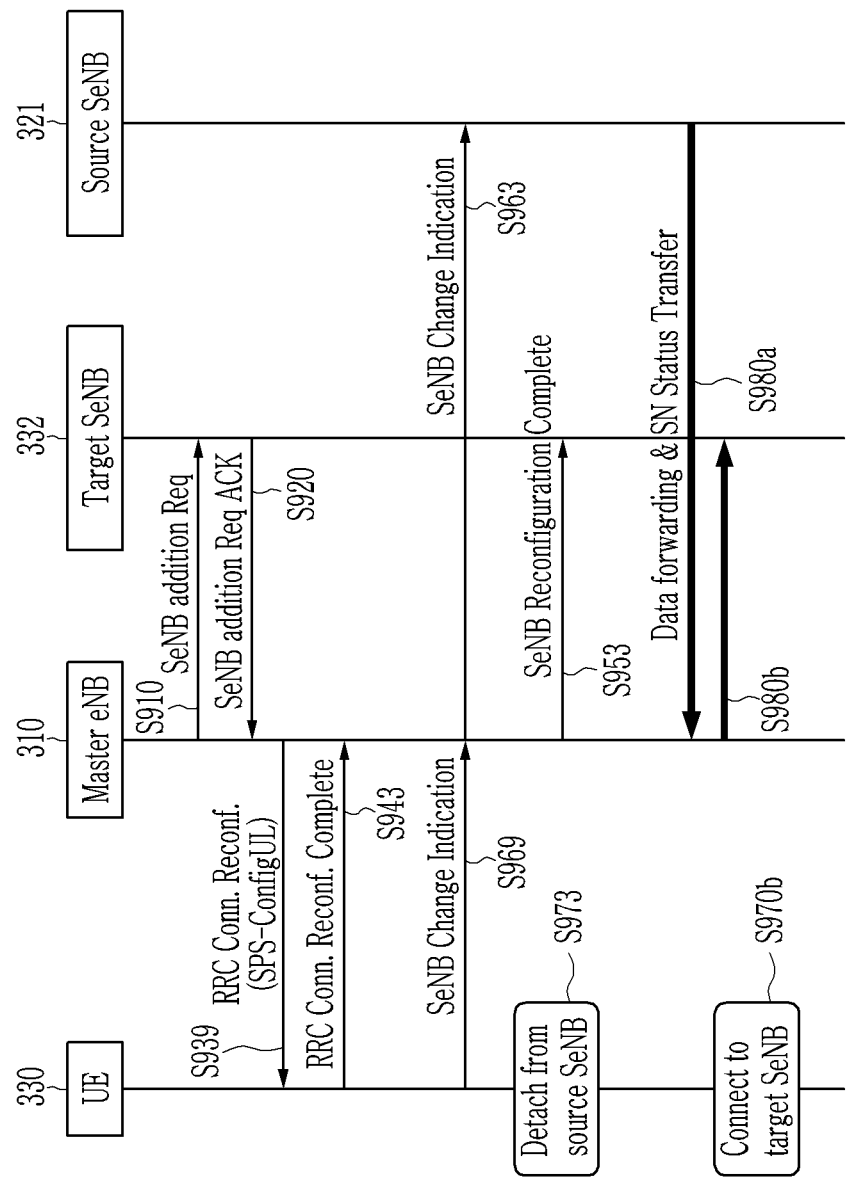

FIG. 12B, FIG. 12C, and FIG. 12D each show a handover method according to another embodiment of the present invention.

In some embodiments, in an embodiment described with reference to FIG. 9, FIG. 10, FIG. 11, FIG. 12A, FIG. 13, FIG. 14, or FIG. 15, a random access procedure (S990 or S991) may be omitted as shown in FIG. 12B. In this case, a UE 330 may synchronize to a target SeNB 322 and access the target SeNB 322 without the random access procedure. Hereinafter, a SeNB change that that does not perform a random access procedure is referred to as a "RACH-less SC."

In some embodiments, in order to notify RACH-less SC, a SeNB change command, i.e., an RRC connection reconfiguration message may include information indicating that the random access procedure is not needed.

In some embodiments, if RACH-less SC is configured, a master eNB 310 may transmit timing advance indication to a UE 330 through the RRC connection reconfiguration message.

In some embodiments, if RACH-less SC is configured, a target SeNB 322 may transmit uplink allocation to the UE 330 after receiving a SeNB reconfiguration complete message from the master eNB 310.

In some embodiments, the SeNB change, i.e., the RRC connection reconfiguration message may include a typical data forwarding delay value from the source SeNB 321 to the target SeNB 322 (S937). In this case, a time point of a SeNB change execution may be after the typical data forwarding delay after the UE 330 receives an ACK on a SeNB change indication message.

In some embodiments, UE 330 may transmit a downlink receiver status of the UE 330 to the source SeNB 321 directly or via the master eNB 310 when transmitting the SeNB change indication message (S948a and S948b). In one embodiment, the SeNB change indication message may include the downlink receiver status. In another embodiment, the downlink receiver status may be transmitted through a separate message.

The downlink receiver status may indicate a receiver status of downlink data, for example, a downlink PDCP SDU in the UE 330. The source SeNB 321 may forward to the target SeNB 322 only data which are needed to be retransmitted to the UE 330 in accordance with the downlink receiver status transmitted by the UE 330. Then, since the target SeNB 322 can transmit to the UE 330 only data which are needed to be retransmitted in accordance with the downlink receiver status, the data duplication and the data interruption time can be eliminated.

In one embodiment, the downlink receiver status may be a downlink receiver status of E-RABs for which PDCP status preservation applies, and may be transmitted through an RLC (radio link control) status PDU or a PDCP status report message.

In some embodiments, the source SeNB 321 may transmit an uplink receiver status when transmitting an ACK on a SeNB change indication message. The uplink receiver status may indicate a receiver status of uplink data, for example, an uplink PDCP SDU in the source SeNB 321. The UE 330 may transmit to the target SeNB 322 data which are needed to be retransmitted in accordance with the uplink receiver status transmitted by the source SeNB 321.

In one embodiment, the uplink receiver status may be an uplink receiver status of E-RABs for which PDCP status preservation applies, and may be transmitted through an RLC status PDU or a PDCP status report message.

As in FIG. 12B, a random access procedure may be omitted in the SeNB change method described with reference to FIG. 12C.

In embodiments described with reference FIG. 9 to FIG. 15, a UE 330 may transmits a SeNB change indication message using an SPS resource. For this, as shown in FIG. 12D, a master eNB 310 may configure an uplink SPS resource by transmitting uplink SPS configuration (SPS-ConfigUL) information when transmitting a SeNB change command, i.e., an RRC connection reconfiguration message (S939). In one embodiment, the RRC connection reconfiguration message may include the SPS-ConfigUL information. The UE 330 receiving the SPS-ConfigUL information may transmit the handover indication message on an SPS resource indicated by the SPS-ConfigUL (S969). As such, since a procedure for allocating the uplink resource to the UE 330 through the SR procedure is not performed, the UE 330 can quickly transmit the SeNB change indication message.

In some embodiments, the UE 330 may transmit a SeNB change complete, i.e., an RRC connection reconfiguration complete message using the uplink SPS resource (S943).

In one embodiment, in a case where the UE 330 transmits the SeNB change indication message to the source SeNB 321 as shown in FIG. 9, FIG. 10, or FIG. 11, the uplink SPS resource may be an uplink SPS resource of the source SeNB 321. In another embodiment, in a case where the UE 330 transmits the SeNB change indication message to the master eNB 310 as shown in FIG. 12A, FIG. 13, FIG. 14, or FIG. 15, the uplink SPS resource may be an uplink SPS resource of the master eNB 310.

In one embodiment, the SPS-ConfigUL information may follow SPS-ConfigUL defined in SPS-Config information element of 3GPP TS 36.331.

In one embodiment, the master eNB 310 may activate the SPS-ConfigUL to allow the UE 330 to use the uplink SPS resource. The master eNB 310 may explicitly activate the SPS-ConfigUL through a downlink assignment. In this case, upon receiving the RRC connection reconfiguration message and the downlink assignment, the UE 330 may regard that the uplink SPS resource is activated and transmit the SeNB change message using the uplink SPS resource. In another embodiment, the master eNB 310 may implicitly activate the SPS-ConfigUL when transmitting the RRC connection reconfiguration message. In this case, upon transmitting the SeNB change indication message after receiving the RRC connection reconfiguration message, the UE 330 may regard that the uplink SPS resource is activated and transmit the SeNB change indication message using the uplink SPS resource. As such, the uplink SPS resource is not wasted by activating the uplink SPS resource at the transmission time of the SeNB change indication message.

Next, embodiments for using a handover method according to various embodiments described above in accordance with a system configuration are described with reference to FIG. 16 and FIG. 17.

Figure 16:
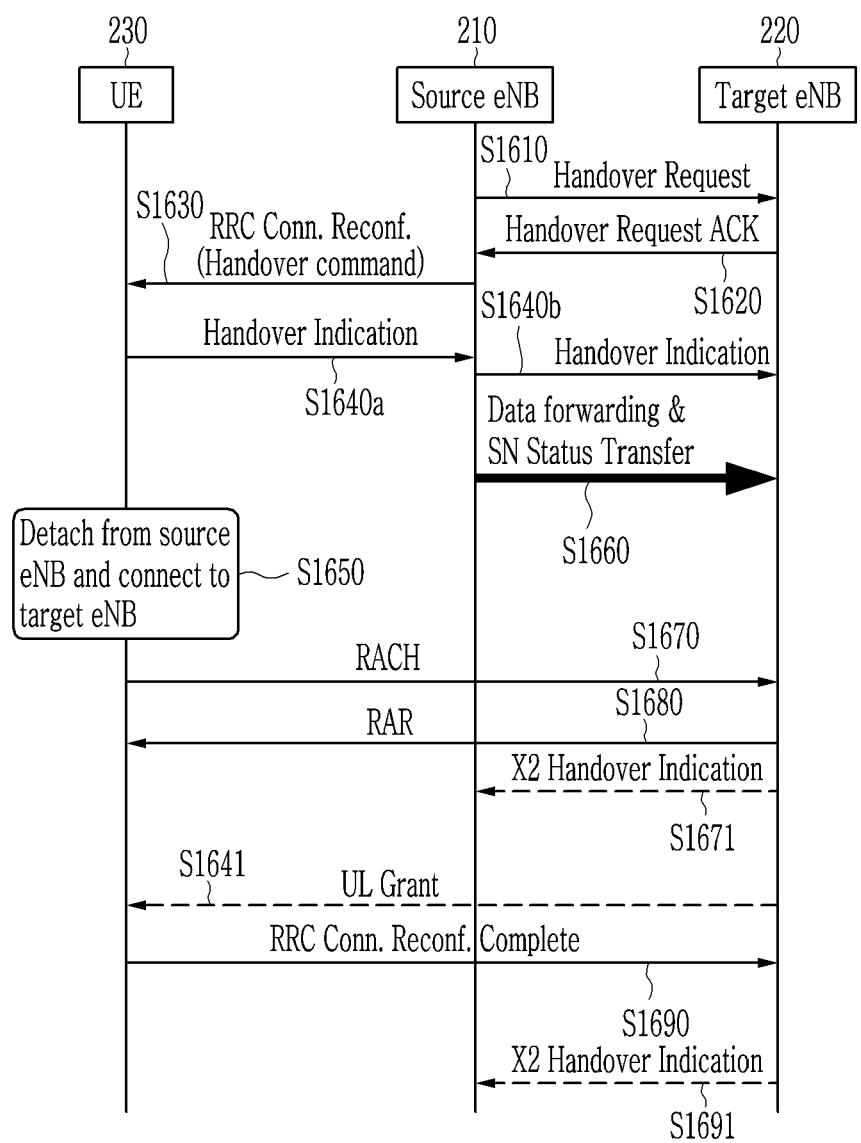
FIG. 16 and FIG. 17 each show a handover method according to an embodiment of the present invention.
Figure 17:
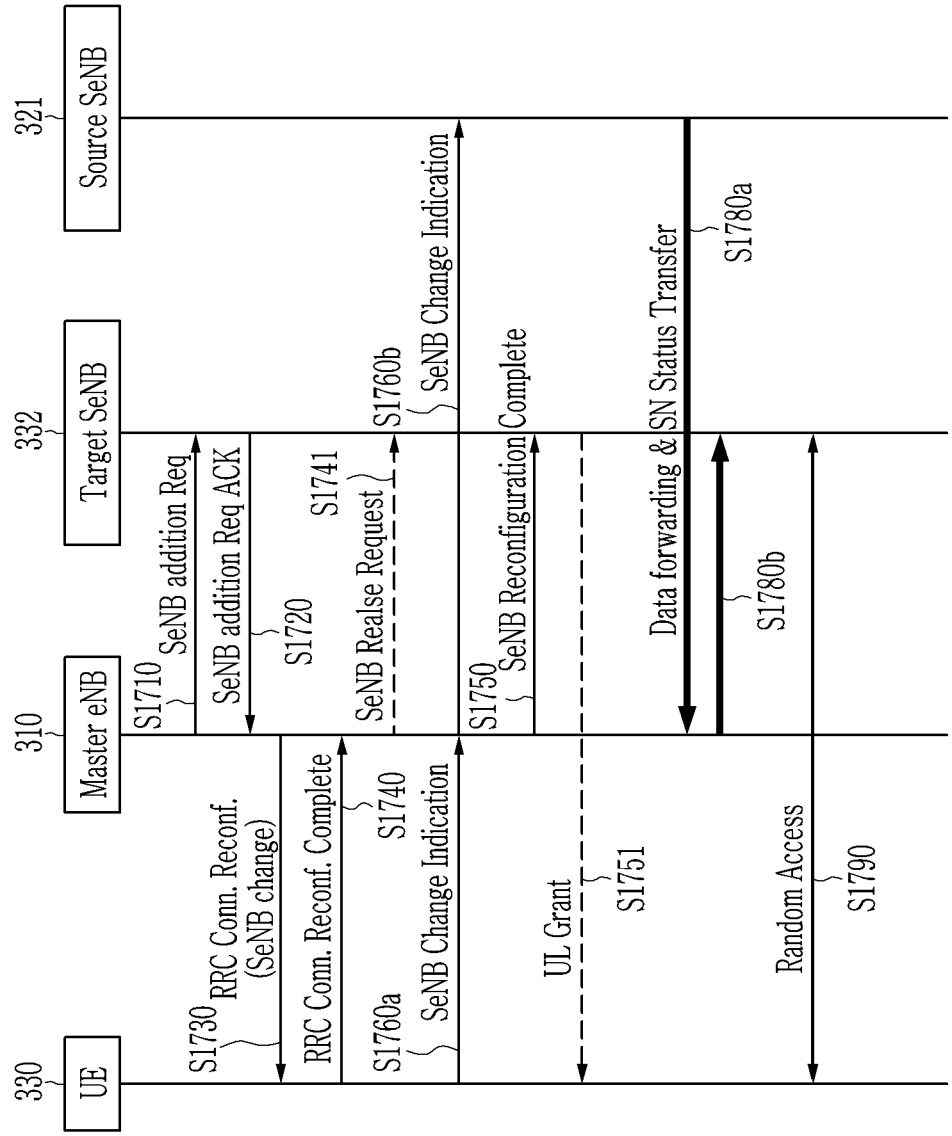

FIG. 16 and FIG. 17 each show a handover method according to an embodiment of the present invention.

Referring to FIG. 16, a source eNB 210 transmits a handover request message to a target eNB 220 (S1610). The target eNB 220 transmits a handover request ACK message to the source eNB 210 after preparing the handover (S1620). In some embodiments, the handover request ACK message may include a transparent container to be transmitted to a UE 230 as an RRC message to perform the handover. In one embodiment, the container may include a new UE identifier (e.g., C-RNTI), a target eNB security algorithm identifier for a selected security algorithm, a dedicated RACH preamble, and possibly some other parameters, i.e. access parameters. In some embodiments, if RACH-less HO is configured, the handover request ACK message, for example, the container included in the handover request ACK message may include timing advance indication. In this case, the timing advance indication may be delivered from the source eNB 210 to the UE 230 through an RRC connection reconfiguration message.

In one embodiment, as described with reference to FIG. 4, the source eNB 210 may decide the handover based on a UE measurement results (S405, S410, and S415).

In some embodiments, if Make-Before-Break HO is not configured, as soon as the source eNB 210 receives the handover request ACK message, or as soon as transmission of a handover command is initiated in the downlink, data forwarding may be initiated.

The source eNB 210 which has completed the handover preparation with the target eNB 220 transmits the handover command to the UE 230 to instruct the UE to perform the handover (S1630). The handover command may be transmitted through the RRC connection reconfiguration message. In some embodiments, the RRC connection reconfiguration message may include mobility control information. In one embodiment, the RRC connection reconfiguration message may include necessary parameters such as the new UE identifier (e.g., C-RNTI), the target eNB security algorithm identifier, and the dedicated RACH preamble. In some embodiments, if RACH-less HO is configured, the RRC connection reconfiguration message may include the timing advance indication. In some embodiments, if Make-Before-Break HO is not configured, the UE 230 may not need to delay the handover execution for delivering a HARQ/ARQ response on the RRC connection reconfiguration message to the source eNB 210. In some embodiments, if Make-Before-Break is configured, a connection to the source eNB 210 may be maintained until the UE 230 executes initial uplink transmission to the target eNB 220. In some embodiments, the UE 230 may be configured with both Make-Before-Break HO and RACH-less HO simultaneously.

In some embodiments, if Make-Before-Break HO is configured, the RRC connection reconfiguration message may include a typical data forwarding delay value from the source eNB 210 to the target eNB 220.

In some embodiments, if Make-Before-Break HO or early handover command is configured, the RRC connection reconfiguration message may include uplink SPS configuration (SPS-ConfigUL) information for the UE 230 to transmit the handover indication message.

In some embodiments, if early handover command is configured, when a plurality of candidate target eNBs are decided by the source eNB 210, the handover preparation procedure in the steps S1610 to S1630 based on the UE measurement results (S405, S410, and S415 of FIG. 4) may be performed per candidate target eNB decided by the source eNB 210.

In one embodiment, if early handover command is configured, the RRC connection reconfiguration message may include an index for the candidate target eNB which is used in the handover indication message.

After transmitting the handover indication message to the source eNB 210 (S1640a), the UE 230 disconnects the connection to the source eNB 210 (S1650).

In some embodiments, if Make-Before-Break HO is configured, the UE 230 may transmit a downlink receiver status to the source eNB 210, with the handover indication message. In one embodiment, the downlink receiver status may be a downlink receiver status of E-RABs for which PDCP status preservation applies, and may be transmitted through an RLC status PDU or PDCP status report message.

In some embodiments, if early handover command is configured, the UE 230 may perform cell selection among candidate target eNBs and, the handover indication message may include an identifier, e.g., PCI (physical cell identity) or an index assigned by the source eNB 210, for the selected target eNB. In other words, when the UE 230 selects a candidate target eNB from among the candidate target eNBs, the UE 230 may include the index for the selected candidate target eNB to the handover indication message. In some embodiments, a time point of a handover execution may be after the UE 230 receives an ACK on the handover Indication message from the source eNB 210.

In some embodiments, if the RRC connection reconfiguration message includes the typical data forwarding delay value, the time point of the handover execution may be after the typical data forwarding delay after the UE 230 receives an ACK on the handover indication message.

In some embodiments, in a case where the UE 230 does not receive the ACK on the handover indication message or is unable to transmit the handover indication message due to poor channel condition, the UE 230 may execute the handover to the target eNB 220 immediately. In this case, if RACH-less HO is configured, the UE 230 may access the target cell via RACH when the UE 230 does not receive the ACK on the handover indication.

The source eNB 210 receiving the handover indication message may transmit the handover indication message to the target eNB 220 to notify the handover execution of the UE (S1640b).

In some embodiments, the handover indication message transmitted by the UE 230 may include a handover complete. In this case, an RRC connection reconfiguration complete message may be omitted. In one embodiment, the handover complete may be included in the handover indication message as an RRC container. The source eNB 210 receiving the handover indication message may transfer the handover indication message including the handover complete or a handover complete message to the target eNB 220. The target eNB 220 receiving the handover complete may recognize that the UE 230 has performed the handover to the target eNB 220, and may transmit downlink data immediately.

In some embodiments, if RACH-less HO is configured, the UE 230 may access the target eNB 220 and transmit an uplink signal through an SRS resource. The target eNB 220 may transmit a control message for adjusting uplink timing advance to the UE 230 based on the uplink signal received from the UE 230. Accordingly, even if the timing advance is not zero or timing advance of the source eNB is different from timing advance of the target eNB, the handover can be performed without the random access procedure.

In one embodiment, if RACH-less HO is configured, the UE 230 may receive uplink grant through an SR procedure if an uplink transmission is needed, and may transmit the uplink signal through a resource allocated by the uplink grant.

In one embodiment, if RACH-less HO is configured, when the UE 230 does not receive a downlink control channel during a predetermined time after accessing the target eNB 220, the UE 230 may disable RACH-less HO and perform the random access procedure to the target eNB 220.

In some embodiments, as soon as the source eNB 210 receives the handover indication message from the UE 230 or transmits the handover indication message to the target eNB 220, data forwarding may be initiated.

In some embodiments, the source eNB 210 may transmit an uplink receiver status to the UE 230, with an ACK on the handover indication message. In one embodiment, the uplink receiver status may be an uplink receiver status of E-RABs for which PDCP status preservation applies, and may be transmitted through an RLC status PDU or PDCP status report message.

In some embodiments, if RACH-less HO is configured, in a case where uplink grant is not included in the RRC connection reconfiguration message, for example, the mobility control information of the RRC connection reconfiguration message, as soon as the target eNB 220 receives the handover indication message from the source eNB 210, the target eNB 220 may transmit pre-allocated or dynamic periodic uplink grant to the UE 230.

The source eNB 210 receiving the handover indication forwards data to the target eNB 220 (S1660). Further, the source eNB 210 transmits an SN status transfer message to the target eNB 220 (S1660). In some embodiments, the SN status transfer message may include values for indicating packets to be transmitted to the UE 230 and packets to be received from the UE. In one embodiment, the SN status transfer message may include an uplink receiver status and a downlink transmitter status.

In some embodiments, if RACH-less HO is not configured, after receiving the RRC connection reconfiguration message, the UE 230 performs synchronization to the target eNB 220 and accesses to the target eNB 220 via RACH (S1670). The target eNB 220 responds with uplink allocation and timing advance (S1680).

In some embodiments, if RACH-less HO is configured, after receiving the RRC connection reconfiguration message, the UE 230 may perform the synchronization to the target eNB 220 and access to the target eNB 220. In some embodiments, if RACH-less HO is configured, the target eNB 220 may transmit uplink grant to the UE 230 after receiving the handover indication message from the source eNB 210 (1641).

After the UE 230 has successfully accessed the target eNB 220, the UE 230 transmits the RRC connection reconfiguration complete to the target eNB 220 to indicate that the handover procedure is completed (S1690).

In some embodiments, if Make-Before-Break HO is configured, the UE 230 may transmit the RRC connection reconfiguration complete message along with a PDCP status report indicating the received data (e.g., PDCP packets). The target eNB 220 may remove the buffered data (PDCP packets) based on the PDCP status report and begin transmitting data to the UE 230.

In some embodiments, if Make-Before-Break HO is configured, as soon as the target eNB 220 receives the handover indication message from the source eNB 210, the target eNB 220 may transmit the data to the UE 230. This may cause the data duplication to the UE 230.

In some embodiments, the target eNB 220 transmits an X2 handover indication message to the source eNB 210 (S1691) if the target eNB 220 does not receive the handover indication message from the source eNB 210 when the target eNB 220 receives the RRC connection reconfiguration complete message from the UE 230. Even if an error occurs at the transmission of the handover indication message from the UE 230 to the source eNB 210, the target eNB 220 may request the data forwarding to the source eNB 210 through the X2 handover indication message if the target eNB 220 knows, through the RRC connection reconfiguration complete message, that the UE 230 completed the handover.

In some embodiments, if RACH-less HO is not configured, the target eNB 220 may transmit an X2 handover indication message to the source eNB 210 (S1671) if the target eNB 220 does not receive the handover indication message from the source eNB 210 when the target eNB 220 receives a dedicated RACH preamble indicated in the mobility control information from the UE 230.

In some embodiments, after a handover complete is transferred to the target eNB 220, a handover completion procedure may be performed among the source eNB 210, the target eNB 220, the MME, and the gateway. In one embodiment, the handover completion procedure (S460, S465, S470, S475, S480, S485, S490, and S495) may be performed as described with reference to FIG. 4.

Referring to FIG. 17, a master eNB 310 transmits a SeNB addition request message to a target SeNB 322 (S1710), and the target SeNB 322 transmits a SeNB addition request ACK message to the master eNB 310 (S1720). In some embodiments, the SeNB addition request message may include a secondary cell group (SCG) configuration of an old SeNB. In some embodiments, if forwarding is needed, the target SeNB 322 may provide forwarding addresses to the master eNB (S1720).

In some embodiments, if Make-Before-Break SC is not configured, when resource allocation of the target SeNB 322 is successful, the master eNB 310 may initiate resource release of a source SeNB 321 by transmitting a SeNB release request message to the source SeNB 321. If data forwarding is needed, the master eNB 310 may provide data forwarding addresses to the source SeNB 321.

In some embodiments, if Make-Before-Break SC is configured, the master eNB 310 may initiate the resource release of the source SeNB 321 by transmitting the SeNB release request message (S1741) after receiving an RRC connection reconfiguration complete message from a UE 330 (S1740). In this case, the RRC connection reconfiguration complete message operates as a SeNB change indication message.

In some embodiments, if the RRC connection reconfiguration complete message needs to be transmitted earlier than a time point of a SeNB change, a master eNB 310 may initiate the resource release of the source SeNB 321 after receiving a SeNB change indication message from the UE 330 (S1760*a*).

The master eNB 310 triggers the UE 330 to apply a new configuration (S1730). The master eNB 310 indicates the new configuration (i.e., commands the SeNB change) by transmitting an RRC connection reconfiguration message to the UE 330 (S1730). The UE 330 transmits the RRC connection reconfiguration complete message to the master eNB 310 (S1740). In some embodiments, if RACH-less SC is configured, the master eNB 310 may transfer timing advance indication to the UE 330 through the RRC connection reconfiguration message. In some embodiments, if Make-Before-Break SC is configured, the source SeNB 321 may continue transmitting downlink data to the UE 330 until the UE 330 executes initial uplink transmission to the target SeNB 322.

In some embodiments, if Make-Before-Break SC is configured, the RRC connection reconfiguration message may include a typical data forwarding delay value from the source SeNB 321 to the target SeNB 322.

In some embodiments, if Make-Before-Break SC or early handover command is configured, the RRC connection reconfiguration message may include uplink SPS configuration (SPS-ConfigUL) information for the UE 330 to transmit the SeNB change indication message.

In some embodiments, if early handover command is configured, when a plurality of candidate target SeNBs are decided by the master eNB 310, the procedures (S1710 to S1730) may be performed per candidate target SeNB decided by the master eNB 310. In one embodiment, if early handover command is configured, the RRC connection reconfiguration message may include an index for a candidate target SeNB which is used in the SeNB change indication message.

In some embodiments, if Make-Before-Break SC is configured, the UE 330 may transmit the RRC connection reconfiguration complete message to the master eNB 310 to notify a SeNB change execution just before the SeNB change (S1740). Alternatively, the UE 330 may the SeNB change indication message to the master eNB 310 to notify the SeNB change execution (S1760*a*). In one embodiment, if the RRC connection reconfiguration complete message cannot be transmitted just before the SeNB change, the UE 330 may transmit the SeNB change indication message. After deciding the time point of the SeNB change, the UE 330 detaches from the source SeNB 321 and synchronizes to the target SeNB 322.

In some embodiments, if Make-Before-Break SC is configured, the UE 330 may transmit a downlink receiver status with the SeNB change indication message (S1760*a*). In one embodiment, the downlink receiver status may be a downlink receiver status of E-RABs for which PDCP status preservation applies, and may be transmitted through an RLC status PDU or PDCP status report message. In another embodiment, when the RRC connection reconfiguration complete message serves as the SeNB change indication message, the downlink receiver status may be transmitted with the RRC connection reconfiguration complete message.

In some embodiments, if early handover command is configured, the UE 330 may perform cell selection among candidate target SeNBs, and the SeNB change indication message (or the RRC connection reconfiguration complete message) may include an identifier, for example, PCI or an index assigned by the master eNB 310, for the selected target eNB. In other words, if the UE 330 selects a candidate target SeNB from among the candidate target SeNBs, the index for the selected candidate target SeNB may be included in the SeNB change indication message.

In some embodiments, the UE 330 may transmit the SeNB change indication message to the source SeNB 321 directly if allowed.

In some embodiments, the time point of the SeNB change may be after the UE 330 receives an ACK on the SeNB change indication message from the source SeNB 321.

In some embodiments, the time point of the SeNB change may be after the typical data forwarding delay after the UE 330 receives the ACK on the SeNB change indication message in a case where the typical data forwarding delay value is included in the RRC connection reconfiguration message.

In some embodiments, in a case where the UE 330 does not receive the ACK on the SeNB change indication message or is unable to transmit the SeNB change indication message due to poor channel condition, the UE 330 may execute the SeNB change to the target SeNB 322 immediately. In such a case, if RACH-less SC is configured, RACH-less SC is disabled.

If Make-Before-Break SC is configured, the master eNB 310 may transmit the SeNB change indication message to the source SeNB 321 to notify the SeNB change execution of the UE 330 (S1760*b*). In some embodiments, the source SeNB 321 may transmit an uplink receiver status after receiving the SeNB change indication message. In one embodiment, the uplink receiver status may be an uplink receiver status of E-RABs for which PDCP status preservation applies, and may be transmitted through an RLC Status PDU or PDCP status report message.

In some embodiments, if RACH-less SC is configured, the UE 330 may access the target SeNB 322 and transmit an uplink signal through an SRS resource. The target SeNB 322 may transmit a control message for adjusting uplink timing advance to the UE 330 based on the uplink signal received from the UE 330. Accordingly, even if the timing advance is not zero or timing advance of the source SeNB is different from timing advance of the target SeNB, the SeNB change can be performed without the random access procedure.

In one embodiment, if RACH-less SC is configured, the UE 330 may receive uplink grant through an SR procedure if an uplink transmission is needed, and may transmit the uplink signal through a resource allocated by the uplink grant.

In one embodiment, if RACH-less SC is configured, when the UE 330 does not receive a downlink control channel during a predetermined time after accessing the target SeNB 322, the UE 330 may disable RACH-less SC and perform the random access procedure to the target SeNB 322.

If the RRC connection reconfiguration procedure is successful, the master eNB 310 informs the target SeNB 322 by transmitting a SeNB reconfiguration complete message (S1750). In some embodiments, the SeNB reconfiguration complete message may include the downlink receiver status received from the UE 330. In some embodiments, if Make-Before-Break SC is configured, as soon as the target SeNB 322 receives the SeNB change indication message from the source SeNB 321, the target SeNB 322 may transmit data to the UE 330. This may cause the data duplication in the UE 330.

While it is shown in FIG. 17 that the master eNB 310 transmits the SeNB reconfiguration complete message to the target SeNB 322 (S1750) after the UE 330 transmits the SeNB change indication message (S1760*a*), execution order of the steps 1760*a* and S1750 is not limited thereto. For example, the steps 1760*a* and S1750 may be executed simultaneously, or the step S1750*a* may be executed after the step S1750 is executed.

The UE 330 synchronizes to the target SeNB 322. In some embodiments, if RACH-less SC is not configured, the UE 330 may perform the random access procedure after the synchronization (S1790). In some embodiments, if RACH-less SC is configured, the target SeNB 322 may transmit uplink grant to the UE 330 for an initial transmission of the UE 330 (S1751) after receiving the SeNB reconfiguration complete message from the master eNB 310 (S1750).

The source SeNB 321 initiates data forwarding to the target SeNB 322 via the master eNB 310 (S1780*a* and S1780*b*). Further, the source SeNB 321 transmits an SN status transfer message to the target SeNB 322 via the master eNB 310 (S1780*a* and S1780*b*). In some embodiments, if Make-Before-Break SC is not configured, the data forwarding may be initiated as early as the source SeNB 321 receives the SeNB release request message from the master eNB 310. In some embodiments, if Make-Before-Break SC is configured, the data forwarding may be initiated as early as the source SeNB 321 receives the SeNB release request message or the SeNB change indication message.

While it is shown in FIG. 17 that the random access procedure is performed (S1750) after the data forwarding is initiated (S1780*a* and S1780*b*), execution order of the steps S1780*a*, S1780*b*, and S1790 is not limited thereto. For example, the steps S1780*a*, S1780*b*, and S1790 may be executed simultaneously, or the steps S1780*a* and S1780*b* may be executed after the step S1790 is executed.

In some embodiments, if Make-Before-Break SC is configured, as soon as the target SeNB 322 receives the SeNB change indication message or the SeNB reconfiguration complete message, the target SeNB 322 may transmit data to the UE 330. This may cause the data duplication in the UE 330.

In some embodiments, if RACH-less SC is not configured, the target SeNB 322 may transmits an X2 SeNB change indication message if the target SeNB 322 does not receive the SeNB change indication message when the target SeNB 322 receives a dedicated RACH preamble indicated in the SCG configuration from the UE 330.

In some embodiments, after the SeNB change to the target SeNB 322 is executed, a path update procedure may be performed among the master eNB 310, the source SeNB 321, the target SeNB 322, the MME, and the gateway. In one embodiment, the path update procedure (S555, S560, S565, S570, S575, and S580) may be performed as described with reference to FIG. 5.

Next, an SN status transfer message and data forwarding in a handover method according to an embodiment of the present invention are described with reference to FIG. 18 to FIG. 20.

First, an SN status transfer message and data forwarding are described in a conventional handover method.

In the conventional handover method, after transmitting a handover command to a UE, a source eNB transmits an SN status transfer message to a target eNB and initiates data forwarding. For example, the source eNB may forward a sequence number of a next downlink PDCP to be transmitted by the target eNB, and may forward PDCP SDUs which are not received by the UE to the target eNB along with sequence numbers, in accordance with a downlink PDCP receiver status of the UE. Further, the source eNB may forward data received from a gateway to the target eNB without a sequence number. Furthermore, if the source eNB receives an end marker from the gateway, the source eNB may transfer the end marker to the target eNB.

Figure 18:
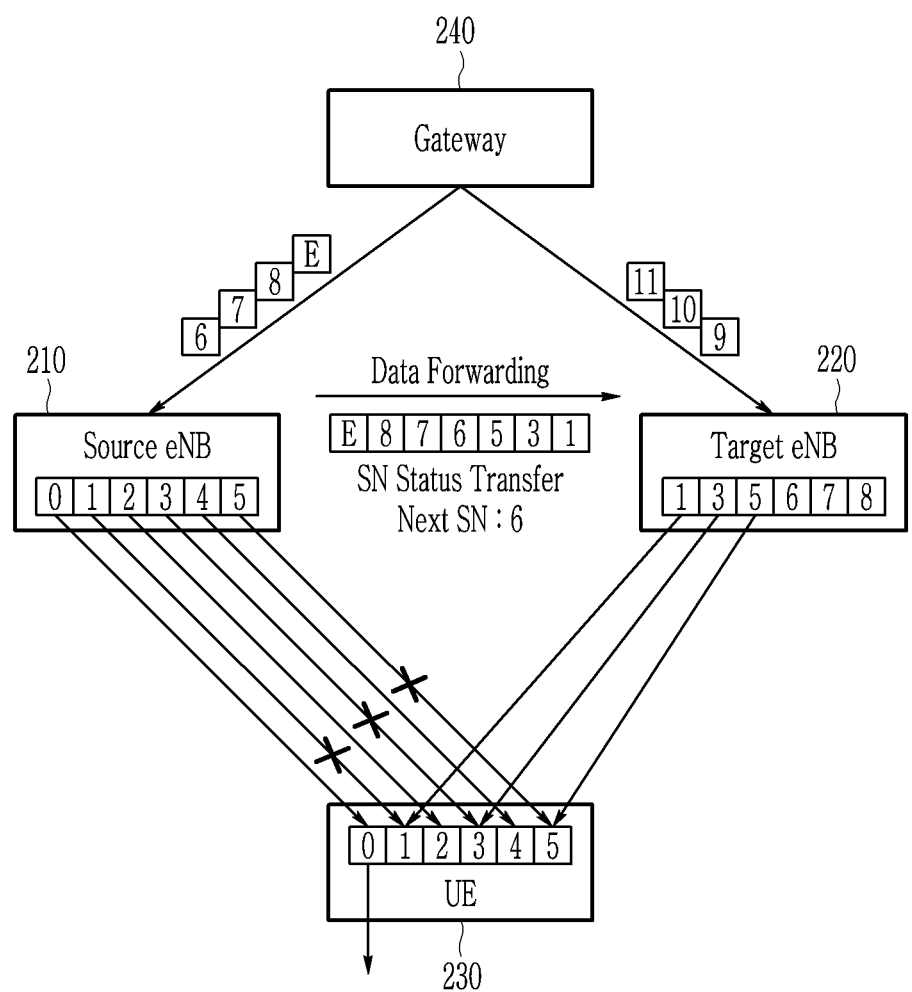
FIG. 18 is a drawing explaining an SN status transfer message and downlink data forwarding in a conventional handover method.

FIG. 18 is a drawing explaining an SN status transfer message and downlink data forwarding in a conventional handover method.

It is assumed in FIG. 18 that a source eNB 210 has transmitted SDUs with SN #0 to SN #5 to a UE 230 before the UE 230 executes a handover, a gateway 240 transmits an end marker after an SDU with SN #8, and the UE 230 does not receives SDUs with SN #1, SN #3, and SN #5.

Referring to FIG. 18, the source eNB 210 stops a downlink data transmission to the UE 230 after transmitting a handover command to the UE 230. The source eNB 210 transmits an SN status transfer message to the target eNB 220. The source eNB 210 forwards PDCP SDUs which are not received by the UE 230 to the target eNB 220 along with SNs, in accordance with a downlink PDCP SN receiver status of the UE 230. In an example shown in FIG. 18, the SDUs with SN #1, SN #3, and SN #5 may be forwarded to the target eNB 220. Further, the source eNB 210 forwards SDUs (SDUs with SN #6, SN #7, and SN #8 in the example shown in FIG. 18) transferred from the gateway 240 to the target eNB 220 without SNs, and transfers an end marker transferred from the gateway 240 to the target eNB 220. In the example shown in FIG. 18, the SN status transfer message may indicate that an SN of a next SDU to be transmitted to the UE is #6.

Figure 19:
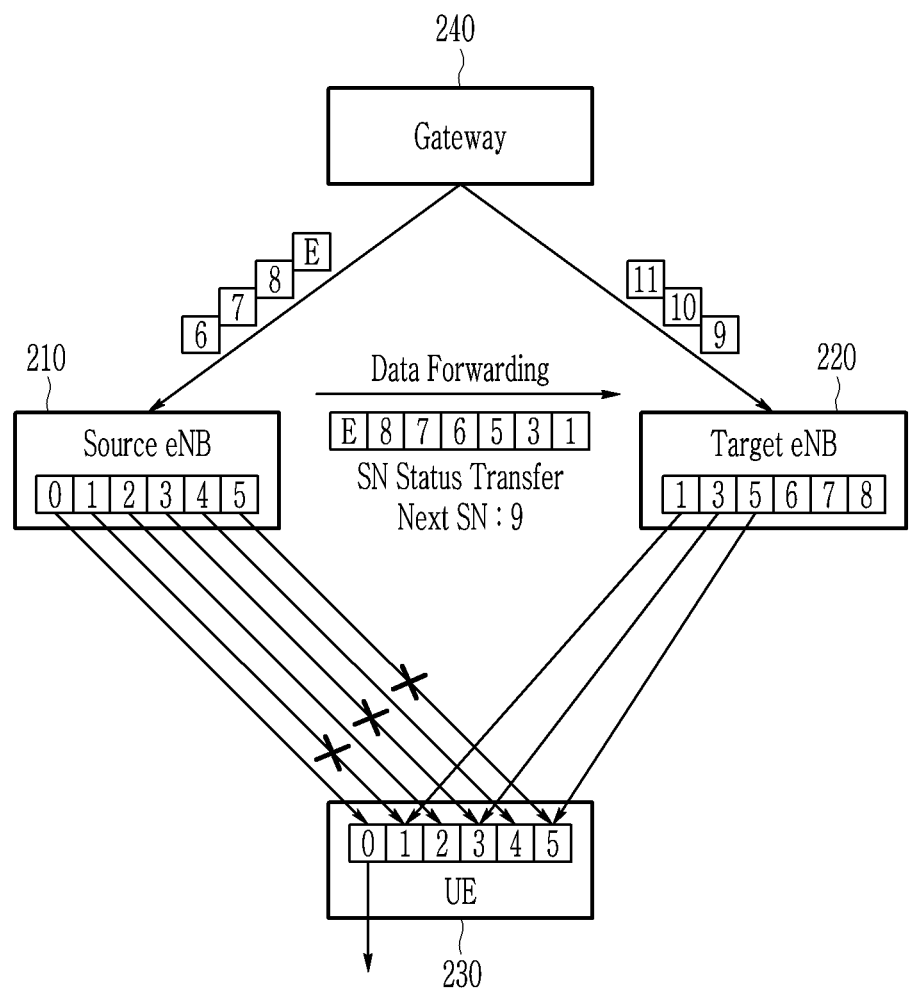
FIG. 19 is a drawing explaining an SN status transfer message and downlink data forwarding in a handover method according to an embodiment of the present invention.

FIG. 19 is a drawing explaining an SN status transfer message and downlink data forwarding in a handover method according to an embodiment of the present invention.

It is assumed in FIG. 19 that a source eNB 210 has transmitted SDUs with SN #0 to SN #5 to a UE 230 before the UE 230 executes a handover, a gateway 240 transmits an end marker after an SDU with SN #8, the source eNB 210 forwards SDUs with SN #6, SN #7, and SN #8 to the target eNB 220 while transmitting those SDUs to the UE 230, and the UE 230 does not receives SDUs with SN #1, SN #3, and SN #5.

Referring to FIG. 19, the source eNB 210 continues transmitting downlink data to a UE 230 after transmitting a handover command to the UE 230. As described with reference to FIG. 7 or FIG. 8, if the UE 230 is able to perform an access procedure to one eNB while being connected to and communicating with the other eNB, or is able to be connected to and communicate with two or more eNBs, the source eNB 210 initiates data forwarding when receiving a data forwarding request message from the UE 230. The source eNB 210 forwards PDCP SDUs which are not received by the UE 230 to the target eNB 220 along with SNs, in accordance with a downlink PDCP SN receiver status of the UE 230. In an example shown in FIG. 19, the SDUs with SN #1, SN #3, and SN #5 may be forwarded to the target eNB 220. Further, the source eNB 210 forwards SDUs (SDUs with SN #6, SN #7, and SN #8) transferred from the gateway 240 to the target eNB 220 along with SNs while transmitting those SDUs to the UE 230, and transfers an end marker transferred from the gateway 240 to the target eNB 220. Upon receiving the handover indication message, the source eNB 210 transmits an SN status transfer message to the target eNB 220. In the example shown in FIG. 19, the SN status transfer message may indicate that an SN of a next SDU to be transmitted to the UE is #9.

Figure 20:
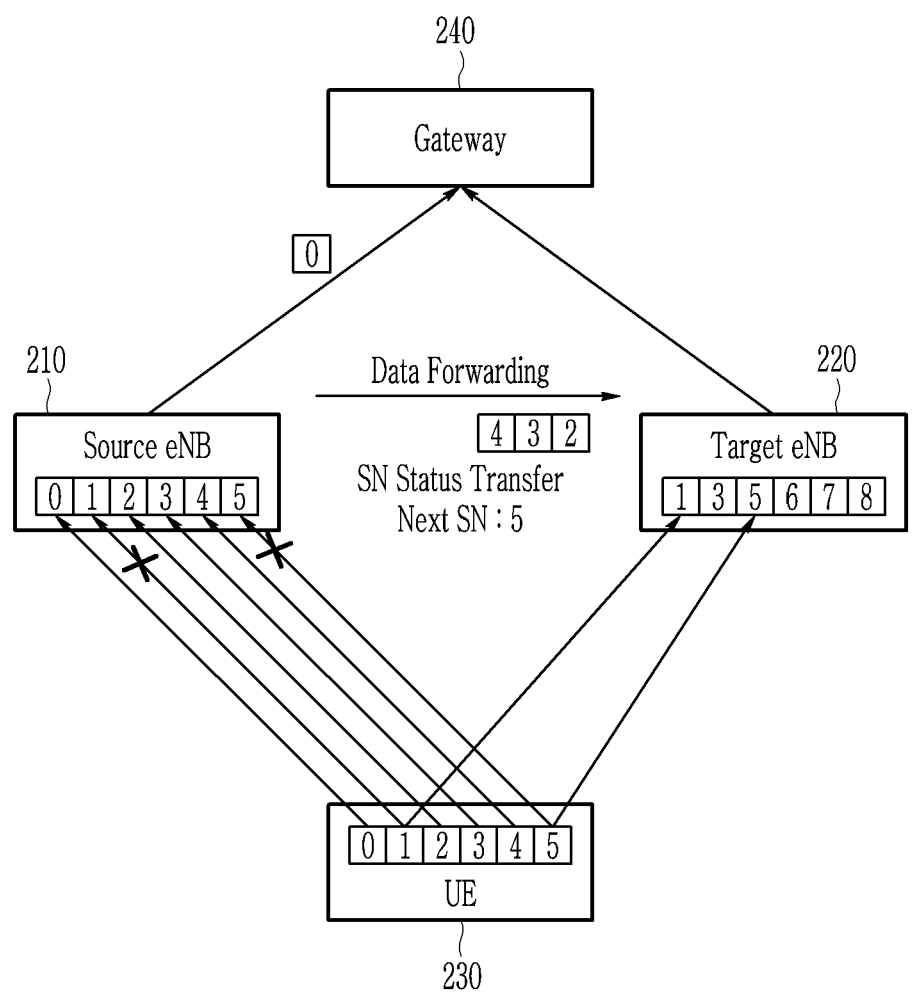
FIG. 20 is a drawing explaining an SN status transfer message and uplink data forwarding in a handover method according to another embodiment of the present invention.

FIG. 20 is a drawing explaining an SN status transfer message and uplink data forwarding in a handover method according to another embodiment of the present invention.

It is assumed in FIG. 20 that a UE 230 has transmitted SDUs with SN #0 to SN #5 to a source eNB 210 before the UE 230 executes a handover, and the source eNB 210 does not receive the SDUs with SN #1 and #5.

Referring to FIG. 20, the source eNB 210 continues receiving uplink data from the UE 230 after transmitting a handover command to the UE 230. As described with reference to FIG. 6, if the UE 230 is able to be connected to only a single eNB, the source eNB 210 transmits an SN status transfer message to the target eNB 220 when receiving a handover indication message from the UE 230. The source eNB 210 forwards PDCP SDUs, which are not received sequentially, to the target eNB 220 along with SNs, in accordance with an uplink PDCP SN receiver status. In an example shown in FIG. 20, the source eNB 210 may forward the SDUs with SN #2, SN #3, and SN #4 to the target eNB 220 along with the SNs. The SN status transfer message may indicate a next value (#5 in the example shown in FIG. 20) of the largest received SN in accordance with uplink PDCP SN receiver status.

As described with reference to FIG. 7 or FIG. 8, if the UE 230 is able to perform an access procedure to one eNB while being connected to and communicating with the other eNB, or is able to be connected to and communicate with two or more eNBs, the source eNB 210 forwards PDCP SDUs, which are not received sequentially, to the target eNB 220 along with SNs when receiving a data forwarding request message from the UE 230. Upon a handover indication message, the source eNB 210 transmits an SN status transfer message to the target eNB 220. In the example shown in FIG. 20, the SN status transfer message may indicate a next value #5 of the largest received SN in accordance with uplink PDCP SN receiver status.

While this invention has been described in connection with what is presently considered to be practical embodiments, it is to be understood that the invention is not limited to the disclosed embodiments, but, on the contrary, is intended to cover various modifications and equivalent arrangements included within the spirit and scope of the appended claims.

The invention claimed is:

1. A handover method performed by a UE, the method comprising:
   receiving, by the UE, a handover command from a source eNB;
   deciding, by the UE, a time point of a handover execution while maintaining a connection to the source eNB; and
   executing, by the UE, a handover based on the time point decided by the UE without any handover timing information from the source eNB,
   wherein the executing the handover comprises:
   performing a random access procedure with a target eNB when a handover that does not perform the random access procedure is not configured;
   continuing to receive data from the source eNB after successfully completing the random access procedure;
   transmitting a handover complete to the target eNB; and
   stopping receiving data from the source eNB after transmitting the handover complete.

2. The method of claim 1, wherein the executing the handover further comprises:
   disconnecting the connection to the source eNB after transmitting the handover complete.

3. The method of claim 1, wherein the executing the handover further comprises transmitting a handover indication message to the source eNB to notify the handover execution before performing the random access procedure.

4. The method of claim 1, wherein the executing the handover further comprises transmitting a handover indication message to the source eNB to notify the handover execution after transmitting the handover complete.

5. The method of claim 1, wherein the stopping receiving the data from the source eNB includes stopping receiving the data from the source eNB in response to a predetermined message transmitted to the source eNB after transmitting the handover complete.

6. A handover method performed by an eNB, the method comprising:
 transmitting a handover command to a UE;
 deciding a time point of a handover by the UE, the handover being executed based on a time point of a handover execution decided by the UE without any handover timing information from the eNB;
 continuing to transmit data to the UE after the UE successfully completes a random access procedure with a target eNB when a handover that does not perform the random access procedure is not configured;
 stopping transmitting data to the UE after the UE transmits a handover complete to the target eNB;
 disconnecting a connection to the UE after the UE transmits the handover complete to the target eNB; and
 forwarding data to the target eNB.

7. The method of claim 6, wherein the stopping transmitting the data includes stopping transmitting the data to the UE in response to a predetermined message after the UE transmits the handover complete.

8. The method of claim 6, wherein the disconnecting the connection to the UE includes disconnecting the connection to the UE after the UE transmits the handover complete.

9. The method of claim 6, further comprising receiving a handover indication message for notifying the handover execution form the UE before the UE performs the random access procedure.

10. The method of claim 6, further comprising receiving a handover indication message for notifying the handover execution form the UE after the UE transmits the handover complete.

11. A handover method performed by a UE, the method comprising:
 receiving, by the UE, a SeNB change command from a master eNB;
 deciding, by the UE, a time point of a SeNB change execution while maintaining a connection to a source SeNB; and
 executing, by the UE, the SeNB change based on the time point decided by the UE without any SeNB change timing information from the master SeNB.

12. The method of claim 11, wherein the executing the SeNB change comprises:
 disconnecting a connection to the source SeNB based on the time point of the SeNB change execution; and
 accessing a target SeNB.

13. The method of claim 12,
 wherein the executing the SeNB change further comprises transmitting a SeNB change indication message to the source SeNB at the time point of the SeNB change execution, and
 wherein the UE disconnects the connection to the source SeNB after receiving an acknowledgement (ACK) on the SeNB change indication message from the source SeNB.

14. The method of claim 12,
 wherein the executing the SeNB change comprises transmitting a SeNB change indication message to the source SeNB at the time point of the SeNB change execution, and
 wherein the UE disconnects the connection to the source SeNB regardless of a response to the SeNB change indication message from the source SeNB.

15. The method of claim 12, wherein the UE disconnects the connection to the source SeNB at the time point of the SeNB change immediately.

16. The method of claim 11, wherein the executing the SeNB change comprises:
 accessing a target SeNB at the time point of the SeNB change execution; and
 disconnecting a connection to the source SeNB.

17. The method of claim 16, further comprising transmitting to the source SeNB a data forwarding request message for requesting data forwarding to the target SeNB.

18. A handover method performed by a SeNB, the method comprising:
 deciding a time point of a SeNB change by a UE, the SeNB change being executed based on a time point of a SeNB change execution decided by the UE without any SeNB change timing information from the SeNB;
 disconnecting a connection to the UE at the time point of the SeNB change; and
 forwarding data to a target SeNB.

19. The method of claim 18, wherein the deciding the time point of the SeNB change comprises:
 receiving a SeNB change indication message from the UE; and
 determining that a time point at which an ACK on the SeNB change indication message is transmitted is the time point of the SeNB change.

20. The method of claim 18, wherein the deciding the time point of the SeNB change comprises estimating the time point of the SeNB change by the UE.

21. The method of claim 18, wherein the SeNB transmits data to the UE while forwarding same data to the target SeNB.

22. The method of claim 18, further comprising transmitting a downlink sequence number status transfer message and an uplink sequence number status transfer message to the target SeNB.

* * * * *